(12) United States Patent
Dole

(10) Patent No.: US 11,898,628 B2
(45) Date of Patent: *Feb. 13, 2024

(54) CAM GROOVING MACHINE

(71) Applicant: Victaulic Company, Easton, PA (US)

(72) Inventor: Douglas R. Dole, Whitehouse Station, NJ (US)

(73) Assignee: VICTAULIC COMPANY, Easton, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/983,430

(22) Filed: Nov. 9, 2022

(65) Prior Publication Data

US 2023/0067145 A1 Mar. 2, 2023

Related U.S. Application Data

(63) Continuation of application No. 17/500,433, filed on Oct. 13, 2021, now Pat. No. 11,549,574, which is a continuation of application No. 16/677,708, filed on Nov. 8, 2019, now Pat. No. 11,173,533, which is a
(Continued)

(51) Int. Cl.
| | |
|---|---|
| *B21H 7/18* | (2006.01) |
| *B21D 15/00* | (2006.01) |
| *B21D 17/04* | (2006.01) |
| *F16H 53/00* | (2006.01) |

(52) U.S. Cl.
CPC .............. *F16H 53/00* (2013.01); *B21D 15/00* (2013.01); *B21D 17/04* (2013.01); *B21H 7/182* (2013.01)

(58) Field of Classification Search
CPC ........... B21D 17/04; B21H 7/182; B21H 7/18
See application file for complete search history.

(56) References Cited

U.S. PATENT DOCUMENTS

| | | |
|---|---|---|
| 1,414,668 A | 5/1922 | Reed |
| 2,004,816 A | 6/1935 | Lindgren |
| 2,089,475 A | 8/1937 | Grotnes |

(Continued)

FOREIGN PATENT DOCUMENTS

| | | |
|---|---|---|
| CN | 201249229 Y | 6/2009 |
| CN | 201320572 Y | 10/2009 |

(Continued)

OTHER PUBLICATIONS

Author Unknown; SP—The Best Pipe in the World, Company Website, Products, Press Fittings; obtained online at <http://www.superpipe.co.za/SP_PressFittings.htm> on Jan. 29, 2020; pp. 1-2.

(Continued)

*Primary Examiner* — Teresa M Ekiert
(74) *Attorney, Agent, or Firm* — Ballard Spahr LLP

(57) ABSTRACT

A device for cold working pipe elements has two or more cams, each having a gear which meshes with a pinion to turn all of the cams. Each cam has a cam surface with a region of increasing radius and may have a region of constant radius extending around a cam body. Each cam also has a traction surface extending around a cam body. A region of reduced radius in each cam surface is aligned with a gap in the traction surface of each cam. The regions of reduced radius and gaps provide clearance for insertion and removal of the pipe element between the cams to form a circumferential groove when the cams are rotated.

36 Claims, 19 Drawing Sheets

Related U.S. Application Data continuation of application No. 15/358,475, filed on Nov. 22, 2016, now Pat. No. 10,525,517.

(60) Provisional application No. 62/363,892, filed on Jul. 19, 2016, provisional application No. 62/359,395, filed on Jul. 7, 2016, provisional application No. 62/260,922, filed on Nov. 30, 2015.

(56) References Cited

U.S. PATENT DOCUMENTS

| | | |
|---|---|---|
| 2,179,849 A | 11/1939 | Freeze |
| 2,679,089 A | 5/1954 | Opitz et al. |
| 2,684,101 A | 7/1954 | Clerke |
| 2,686,442 A | 8/1954 | Wilson |
| 2,809,687 A | 10/1957 | Ogle |
| 2,821,099 A | 1/1958 | Beecher |
| 2,942,567 A | 6/1960 | Kargard et al. |
| 3,260,089 A | 7/1966 | Hazelton et al. |
| 3,260,090 A | 7/1966 | Sofranko |
| 3,277,684 A | 10/1966 | Gareri |
| 3,299,680 A | 1/1967 | Thompson |
| 3,383,892 A | 5/1968 | Brothen |
| 3,387,477 A | 6/1968 | Shupper |
| 3,473,359 A | 10/1969 | Joslin |
| 3,564,887 A | 2/1971 | Novak et al. |
| 3,595,049 A | 7/1971 | Holt |
| 3,602,025 A | 8/1971 | Awano et al. |
| 3,686,917 A | 8/1972 | Hikida et al. |
| 3,717,017 A | 2/1973 | Vukovich |
| 3,827,269 A | 8/1974 | Hoagland et al. |
| 3,831,416 A | 8/1974 | Wolfe |
| 3,869,895 A | 3/1975 | Holub |
| 4,018,462 A | 4/1977 | Saka |
| 4,043,161 A | 8/1977 | Toma et al. |
| 4,142,393 A | 3/1979 | Nagel |
| 4,143,535 A | 3/1979 | Bouman |
| 4,173,877 A | 11/1979 | Kreiskorte |
| 4,372,026 A | 2/1983 | Mosing |
| 4,389,875 A | 6/1983 | Grotnes, II |
| 4,660,803 A | 4/1987 | Johnston et al. |
| 4,838,066 A | 6/1989 | Marcon et al. |
| 5,002,318 A | 3/1991 | Witter |
| 5,040,729 A | 8/1991 | Carrozza |
| 5,245,848 A | 9/1993 | Lee, Jr. et al. |
| 5,291,769 A | 3/1994 | Miyano |
| 5,435,213 A | 7/1995 | Buck |
| 5,479,961 A | 1/1996 | DeMarsh et al. |
| 5,528,919 A | 6/1996 | McGrady et al. |
| 5,778,715 A | 7/1998 | Lippka et al. |
| 5,911,939 A | 6/1999 | Jenkins |
| 5,950,472 A | 9/1999 | Grotnes et al. |
| 6,145,892 A | 11/2000 | Weber |
| 6,257,627 B1 | 7/2001 | Fujiwara et al. |
| 6,272,895 B1 | 8/2001 | Hamm |
| 6,338,263 B1 | 1/2002 | Obata et al. |
| 6,547,785 B1 | 4/2003 | Heiner et al. |
| 6,776,018 B2 | 8/2004 | Hamm et al. |
| 6,968,719 B2 | 11/2005 | Zifferer |
| 6,976,712 B2 | 12/2005 | Lukach, Jr. |
| 7,997,112 B2 | 8/2011 | Sandman et al. |
| 9,003,851 B2 | 4/2015 | Obata et al. |
| 10,525,516 B2 | 1/2020 | Dole |
| 10,525,517 B2 | 1/2020 | Dole |
| 10,960,450 B2 | 3/2021 | Dole |
| 11,110,503 B2 | 9/2021 | Dole |
| 11,173,533 B2 | 11/2021 | Dole |
| 11,383,285 B2 | 7/2022 | Dole |
| 11,441,662 B2 | 9/2022 | Dole |
| 11,441,663 B2 | 9/2022 | Dole |
| 11,446,725 B2 | 9/2022 | Dole |
| 11,499,618 B2 | 11/2022 | Dole |
| 11,549,574 B2 | 1/2023 | Dole |
| 2002/0007514 A1 | 1/2002 | Dole et al. |
| 2002/0129684 A1 | 9/2002 | Oswald |
| 2003/0192357 A1 | 10/2003 | Hamm et al. |
| 2003/0226387 A1 | 12/2003 | Dole et al. |
| 2004/0221635 A1 | 11/2004 | Bauder |
| 2005/0178179 A1 | 8/2005 | Dole |
| 2006/0011017 A1 | 1/2006 | Kathan |
| 2008/0012326 A1 | 1/2008 | Braathen et al. |
| 2011/0232434 A1 | 9/2011 | Bortoli |
| 2011/0271797 A1 | 11/2011 | Light et al. |
| 2015/0109386 A1 | 4/2015 | Koike et al. |
| 2016/0236256 A1 | 8/2016 | Price et al. |
| 2017/0151596 A1 | 6/2017 | Dole |
| 2018/0318694 A1 | 11/2018 | Paglierani et al. |
| 2019/0184441 A1 | 6/2019 | Dole |
| 2020/0016644 A1 | 1/2020 | Dole |
| 2020/0070231 A1 | 3/2020 | Dole |
| 2020/0070232 A1 | 3/2020 | Dole |
| 2020/0070233 A1 | 3/2020 | Dole |
| 2021/0053102 A1 | 2/2021 | Dole |
| 2021/0170468 A1 | 6/2021 | Dole |
| 2022/0088662 A1 | 3/2022 | Dole |
| 2022/0395882 A1 | 12/2022 | Dole |

FOREIGN PATENT DOCUMENTS

| | | |
|---|---|---|
| CN | 101856706 A | 10/2010 |
| CN | 202100679 U | 1/2012 |
| CN | 102699168 A | 10/2012 |
| CN | 202834505 U | 3/2013 |
| CN | 111699053 A | 9/2020 |
| DE | 2441387 A1 | 3/1976 |
| DE | 102006062208 A1 | 6/2008 |
| EP | 1038603 A2 | 9/2000 |
| GB | 1317148 A | 5/1973 |
| JP | S63126623 A | 5/1988 |
| JP | H11207411 A | 8/1999 |
| JP | 4339527 B2 | 10/2009 |
| JP | 204523912 U | 8/2015 |
| JP | 201753626 A | 12/2017 |
| RU | 2071852 C1 | 1/1997 |
| RU | 2147957 C1 | 4/2000 |
| RU | 2784021 C1 | 1/2022 |
| SU | 628973 A1 | 10/1978 |
| SU | 1687330 A1 | 10/1991 |
| TW | 291451 B | 11/1996 |

OTHER PUBLICATIONS

Dole, Douglas R.; U.S. Appl. No. 16/998,385; Pipe Grooving Device Having Flared Cup; Filed Aug. 20, 2020; 61 pages.

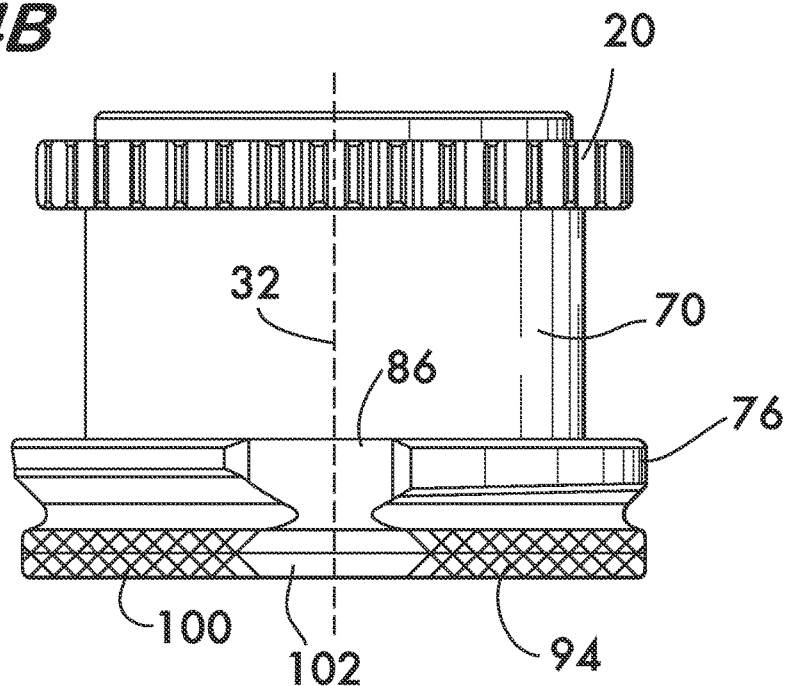
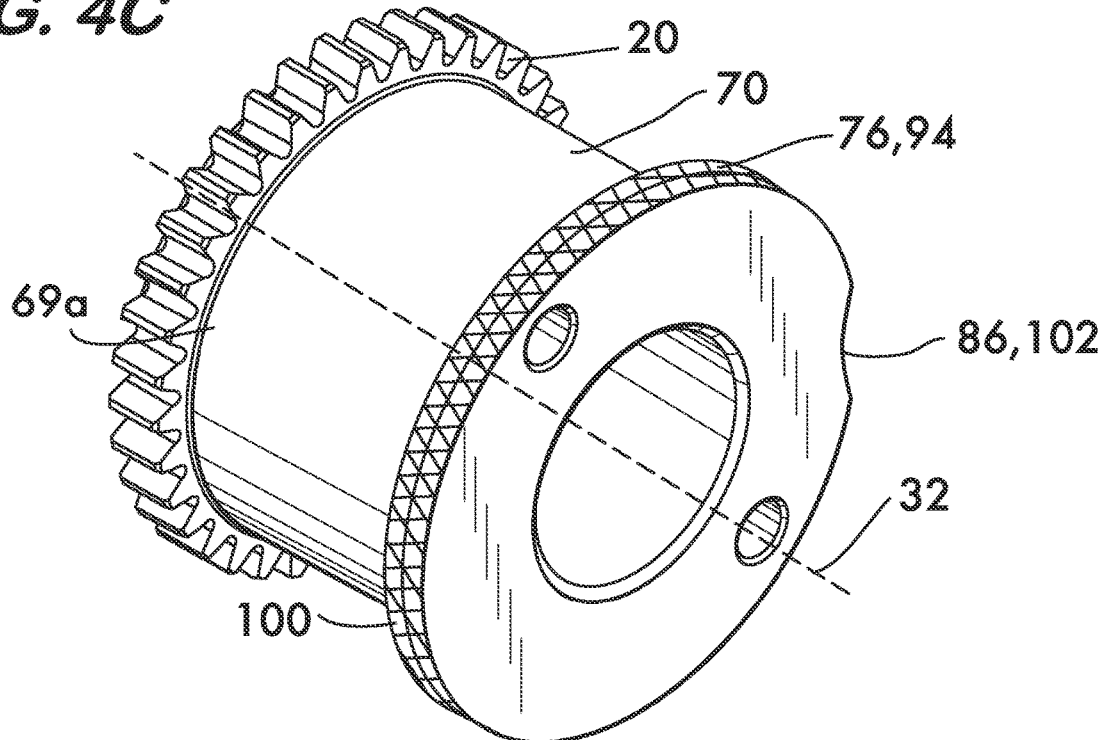

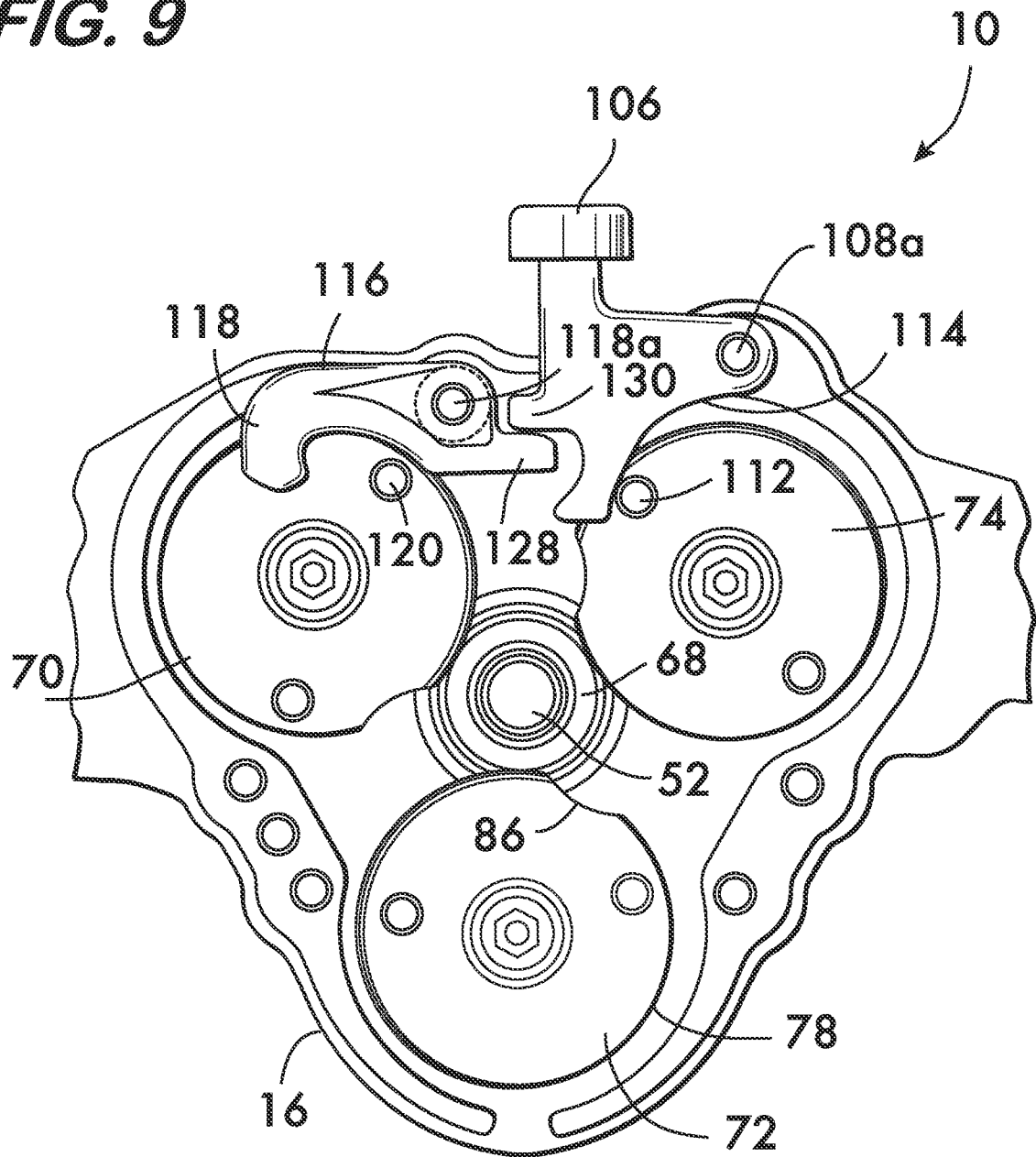

CAM GROOVING MACHINE

CROSS REFERENCE TO RELATED APPLICATIONS

This application claims benefit of priority to and is a continuation of U.S. application Ser. No. 17/500,433, filed Oct. 13, 2021, which application claims benefit of priority to and is a continuation of U.S. application Ser. No. 16/677,708, filed Nov. 8, 2019, which application claims benefit of priority to and is a continuation of U.S. application Ser. No. 15/358,475, filed Nov. 22, 2016, now U.S. Pat. No. 10,525,517, issued Jan. 7, 2020, which application is based upon and claims benefit of priority to U.S. Provisional Application No. 62/260,922, filed Nov. 30, 2015; U.S. Provisional Application No. 62/359,395, filed Jul. 7, 2016; U.S. Provisional Application No. 62/363,892, filed Jul. 19, 2016; and U.S. Provisional Application No. 62/395,747, filed Sep. 16, 2016, all aforementioned applications being hereby incorporated by reference herein.

FIELD OF THE INVENTION

This invention relates to machines using cams to cold work pipe elements.

BACKGROUND

Cold working of pipe elements, for example, impressing a circumferential groove in a pipe element to accept a mechanical pipe coupling, is advantageously accomplished using roll grooving machines having an inner roller which engages an inside surface of the pipe element and an outer roller which simultaneously engages an outside surface of the pipe element opposite to the inner roller. As the pipe is rotated about its longitudinal axis, often by driving the inner roller, the outer roller is progressively forced toward the inner roller. The rollers have surface profiles which are impressed onto the pipe element circumference as it rotates, thereby forming a circumferential groove.

There are various challenges which this technique faces if it is to cold work pipe elements with the required tolerances to the necessary precision. Most pressing are the difficulties associated with producing a groove of the desired radius (measured from the center of the pipe element bore to the floor of the groove) within a desired tolerance range. These considerations have resulted in complicated prior art devices which, for example, require actuators for forcing the rollers into engagement with the pipe element and the ability for the operator to adjust the roller travel to achieve the desired groove radius. Additionally, prior art roll grooving machines have low production rates, often requiring many revolutions of the pipe element to achieve a finished circumferential groove. There is clearly a need for devices, for example, those using cams, to cold work pipe elements which are simple yet produce results with less operator involvement.

SUMMARY

The invention concerns a cam for cold working a pipe element. In one example embodiment the cam comprises a cam body having an axis of rotation. A cam surface extends around the cam body. The cam surface comprises a region of increasing radius and a region of reduced radius. By way of example, the region of reduced radius may comprise a discontinuity of the cam surface. The cam surface may also comprise a region of constant radius positioned adjacent to the region of reduced radius. A traction surface may extend around the cam body. The traction surface comprises a plurality of projections extending transversely to the axis of rotation. The traction surface has a gap therein. The gap is aligned axially with the region of reduced radius of the cam surface. In one example embodiment the traction surface overlies the cam surface. In another example embodiment the traction surface is positioned on the cam body in spaced relation to the cam surface. By way of example, the cam further comprises a gear mounted on the cam body coaxially with the axis of rotation. In one example embodiment the cam surface is positioned between the gear and the traction surface. Further by way of example the cam surface is positioned proximate to the traction surface. In an example embodiment the traction surface has a constant radius measured about and from the axis of rotation.

In a further example embodiment the cam comprises a cam body having an axis of rotation. A plurality of cam surfaces extend around the cam body. Each cam surface comprises a respective region of increasing radius. Each cam surface may also comprise a respective region of constant radius. The radii are measured from and about the axis of rotation. All of the cam surfaces are circumferentially aligned with one another. Respective regions of reduced radius of the cam surfaces are positioned between each of the cam surfaces.

In an example embodiment the cams may further comprise a plurality of traction surfaces extending around the cam body. Each traction surface comprises a plurality of projections extending transversely to the axis of rotation. A respective gap in the traction surfaces is positioned between each of the traction surfaces. Each gap is aligned axially with a respective region of reduced radius of the cam surface. In an example embodiment, all of the traction surfaces are circumferentially aligned with one another. In a particular example, the traction surfaces overlie the cam surfaces. In another example, the traction surfaces are positioned on the cam body in spaced relation to the cam surfaces.

By way of example, a cam further comprises a gear mounted on the cam body coaxially with the axis of rotation. In a specific example the cam surfaces are positioned between the gear and the traction surfaces. In another example the cam surfaces are positioned proximate to the traction surfaces. A specific example embodiment comprises at most two of the cam surfaces and two of the regions of reduced radius of the cam surfaces. Another example embodiment comprises at most two of the cam surfaces, two of the regions of reduced radius of the cam surfaces, two of the traction surfaces and two of the gaps in the traction surfaces.

The invention further encompasses a device for cold working a pipe element. In one example embodiment the device comprises a housing. A plurality of gears are mounted within the housing. Each one of the gears is rotatable about a respective one of a plurality of axes of rotation. The gears are positioned about a central space for receiving the pipe element. A plurality of cam bodies are each mounted on a respective one of the gears. Each one of a plurality of cam surfaces extend around a respective one of the cam bodies and are engageable with the pipe element received within the central space. Each one of the cam surfaces comprises a region of increasing radius and a region of reduced radius. Each one of the cam surfaces may also comprise a region of constant radius positioned adjacent to the region of reduced radius. Each one of the radii is measured about and from a respective one of the axes of rotation. At least one traction surface extends around one of the cam bodies. The at least one traction surface comprises a plurality of projections extending transversely to the axis of rotation of the one cam body. The at least one traction surface has a gap therein. The gap is aligned axially with the region of reduced radius of one the cam surface surrounding the one cam body. A pinion is mounted within the central space within the housing. The pinion meshes with the plurality of gears and is rotatable about a pinion axis.

Another example embodiment comprises a plurality of traction surfaces. Each one of the traction surfaces extends around a respective one of the cam bodies. Each one of the traction surfaces comprises a plurality of projections extending transversely to a respective one of the axes of rotation. Each one of the traction surfaces has a gap therein. Each gap is aligned axially with a respective one of the regions of reduced radius of one of the cam surfaces on each one of the cam bodies.

In an example embodiment the at least one traction surface overlies one of the cam surfaces. In another example embodiment the at least one traction surface is positioned on the one cam body in spaced relation to the cam surface extending around the one cam body. By way of example a device may comprise at most, three gears. Each gear comprises one of the cam bodies and the cam surfaces. Another example embodiment may comprise at most, two gears. Each gear comprises one of the cam bodies and the cam surfaces.

In an example embodiment, the one cam surface is positioned between the gear and the at least one traction surface of the one cam body. by way of further example, the one cam surface is positioned proximate to the at least one traction surface of the one cam body.

An example device may further comprise at least one projection attached to the pinion. The at least one projection extends transversely to the pinion axis. At least one cut-out is defined by the housing. The at least one cut-out is positioned in facing relation with the projection. The pinion is movable relatively to the housing along the pinion axis between a first position, wherein the projection engages the cut-out thereby preventing rotation of the pinion, and a second position, wherein the projection is out of engagement with the cut-out thereby permitting rotation of the pinion. In an example embodiment a spring acts between the pinion and the housing to bias the pinion into the first position.

An example embodiment further comprises a cup abutting the pinion. The cup receives the pipe element upon insertion of the pipe element into the central space. In one example embodiment the cup may be attached to the pinion.

By way of further example, a first finger extends from a first one of the cam bodies in a direction offset from a first one of the axes of rotation about which the first one of the cam bodies rotates. An actuator is movably mounted on the housing. The actuator is movable into engagement with the first finger for rotating the first one of the cam bodies about the first one of the axes of rotation. In an example embodiment the actuator comprises a lever pivotably mounted on the housing. The lever has a first surface engageable with the first finger for rotating the first one of the cam bodies about the first one of the axes. In a further example the lever has a second surface engageable with the finger for pivoting the lever into a ready position upon rotation of the first one of the cam bodies. In another example a second finger extends from a second one of the cam bodies in a direction offset from a second one of the axes of rotation about which the second one of the cam bodies rotates. A stop is movably mounted on the housing. The stop is movable into engagement with the second finger for preventing rotation of the second one of the cam bodies about the second one of the axes of rotation. Upon movement of the actuator into engagement with the first finger, the stop further is movable out of engagement with the second finger for permitting rotation of the second one of the cam bodies.

In one example embodiment the stop comprises a hook pivotably mounted on the housing. The hook has a spur extending therefrom and is engageable with the actuator for rotating the hook out of engagement with the second finger upon movement of the actuator.

An example device further comprises a chuck for receiving the pipe element. The chuck is rotatable about a chuck axis. The chuck axis is arranged coaxially with the pinion axis. By way of example the housing is pivotably and slidably mounted adjacent to the chuck. In an example embodiment the device further comprises an electrical motor engaged with the pinion. In a specific example embodiment the electrical motor comprises a servomotor. The device further comprises a controller in communication with the servomotor for controlling the number of rotations of the servomotor and thereby the cam bodies.

Another example embodiment comprises a clutch operating between the electrical motor and the pinion for controlling the number of rotations of the pinion and thereby the cam bodies. A further example embodiment comprises a crank coupled with the pinion. The crank permitting manual turning of the pinion and thereby the gears. In a particular example embodiment the crank is directly coupled with the pinion.

The invention further encompasses an example device for cold working a pipe element comprising a housing. A plurality of gears are mounted within the housing. Each one of the gears is rotatable about a respective one of a plurality of axes of rotation. The gears are positioned about a central space for receiving the pipe element. The example device has a plurality of cam bodies, each cam body is mounted on a respective one of the gears. A plurality of cam surfaces extend around each cam body. Each cam surface is engageable with the pipe element received within the central space and comprises a region of increasing radius and a region of constant radius. The radii are measured about and from one of the axes of rotation. All of the cam surfaces on each cam body are circumferentially aligned with one another. A respective region of reduced radius of the cam surfaces is positioned between each of the cam surfaces on each the cam body. A pinion is mounted within the central space within the housing. The pinion meshes with the plurality of gears and is rotatable about a pinion axis.

Another example embodiment further comprises a plurality of traction surfaces extending around each the cam body. Each traction surface comprises a plurality of projections extending transversely to one of the axes of rotation. A respective gap in the traction surfaces is positioned between each of the traction surfaces on each the cam body. Each gap is aligned axially with a region of reduced radius of the cam surface. By way of example the cam surfaces are positioned between the gear and the traction surfaces on each cam body. In a specific example embodiment the cam surfaces are positioned proximate to the traction surfaces on each the cam body. In another example embodiment, each of the cam bodies comprises at most two of the cam surfaces and two of the regions of reduced radius. By way of further example each of the cam bodies comprises at most two of the cam surfaces, two of the regions of reduced radius of the cam surfaces, two of the traction surfaces and two of the gaps in the traction surfaces.

The invention also encompasses a method of forming a groove in a pipe element. In one example embodiment the method comprises:

contacting the pipe element with a plurality of cam surfaces simultaneously at a plurality of locations on the pipe element;

rotating the pipe element, thereby simultaneously rotating the cam surfaces, each cam surface engaging the pipe element with an increasing radius and thereby deforming the pipe element to form the groove.

An example embodiment of the method further comprises contacting the pipe element with at least one traction surface mounted on at least one cam comprising one of the cam surfaces. Another example embodiment comprising contacting the pipe element with a plurality of traction surfaces. In this example one the traction surface is mounted on a respective one of the cams. Each of the cams comprises one of the plurality of cam surfaces.

Another example embodiment comprises synchronizing rotation of the cam surfaces with one another. A further example embodiment comprises using an actuator to initiate rotation of one of the cam surfaces.

BRIEF DESCRIPTION OF THE DRAWINGS

FIG. 4B is a side view of an example cam according to the invention;

FIG. 4C is an isometric view of an example cam according to the invention;

FIGS. 6 through 9 and 9A are additional cross sectional views illustrating operation of device 10;

DETAILED DESCRIPTION

Figure 1:
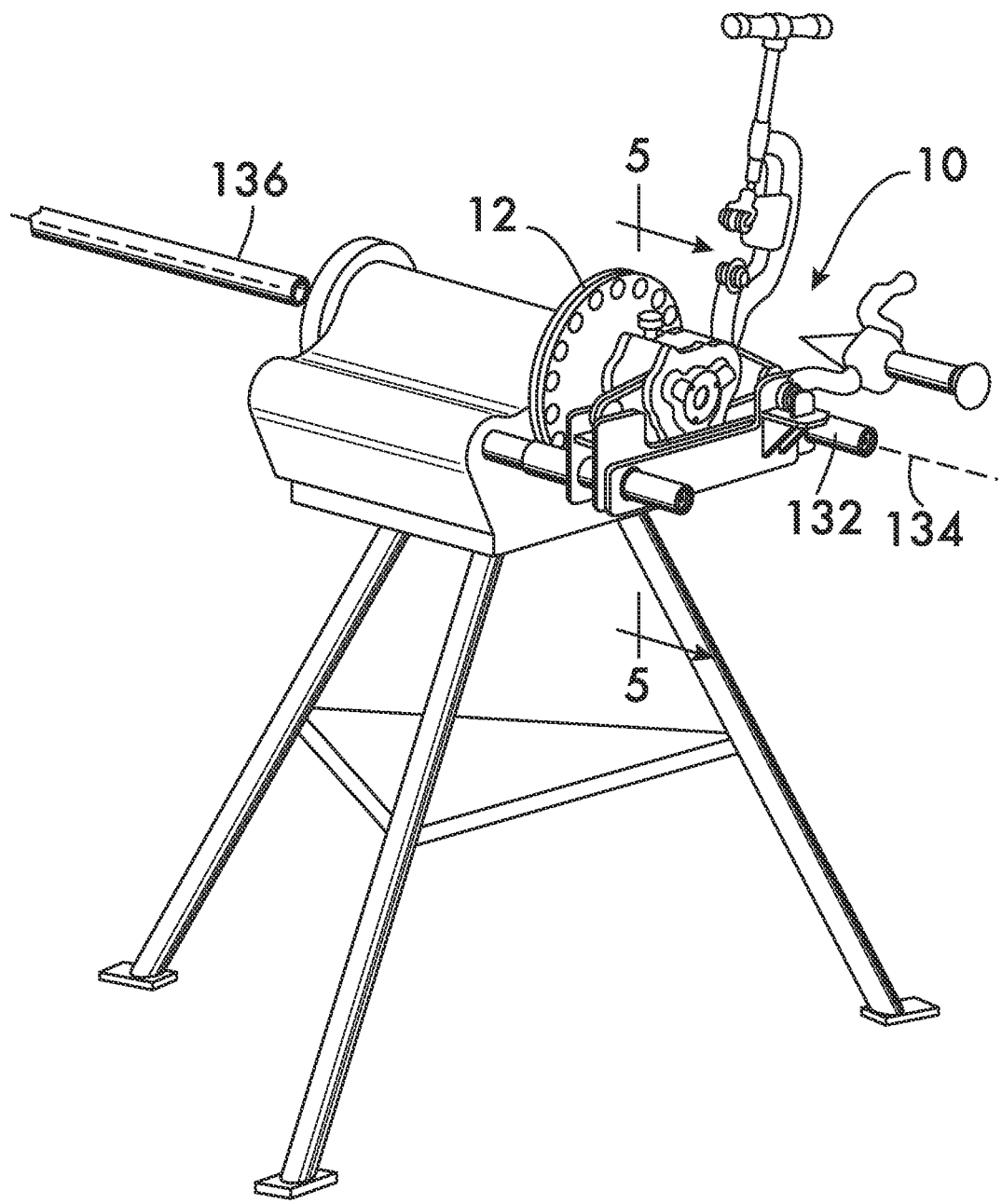
FIG. 1 is an isometric view of an example embodiment of a device according to the invention.

FIG. 1 shows an example device 10 for cold working a pipe element, for example, forming a circumferential groove in the pipe element's outer surface. Device 10 is shown pivotably mounted on a rotating power chuck 12. Such chucks are well known, an example being the Ridgid 300 Power Drive marketed by Ridgid of Elyria, Ohio.

Figure 2:
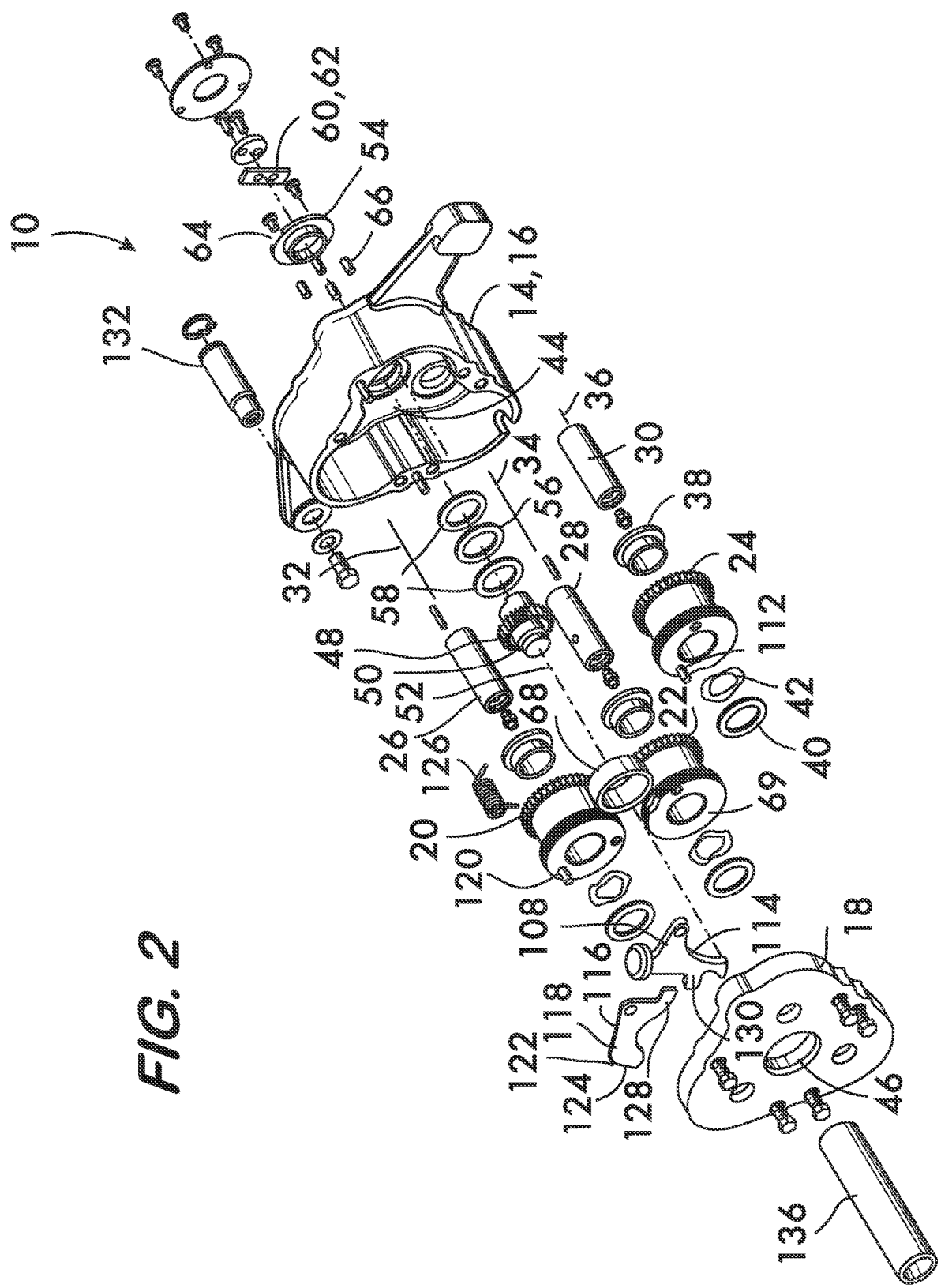
FIG. 2 is an exploded isometric view of a portion of the device shown in FIG. 1.

FIG. 2 shows an exploded view of device 10 which comprises a housing 14. Housing 14 is formed of a housing body 16 and a cover 18. A plurality of gears, in this example three gears 20, 22 and 24 are rotatably mounted on respective shafts 26, 28 and 30, the shafts being supported by the housing body 16 and cover 18 and defining respective axes of rotation 32, 34 and 36. In a practical design each gear 20, 22 and 24 has a respective flanged bushing 38, and may also have a thrust washer 40 and a compression spring 42. The compression springs 42 act between the gears 20, 22 and 24 and the cover 18 to bias the gears away from the cover.

Figure 3:
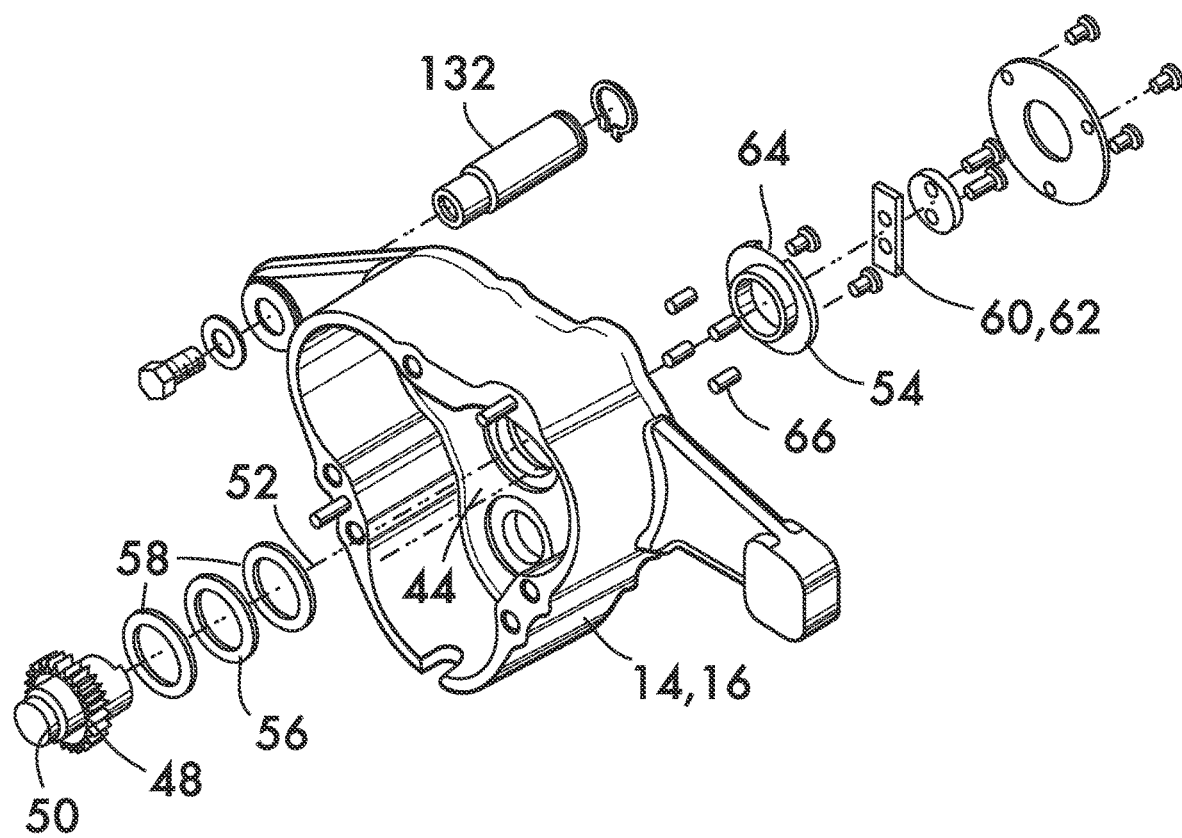
FIG. 3 is an exploded isometric view of components of the device shown in FIG. 1.

Gears 20, 22 and 24 are positioned about a central space 44 which receives a pipe element 136 to be cold worked by the device 10. An opening 46 in cover 18 provides access to the central space 44 and permits pipe element insertion into the device 10. As shown in FIGS. 2 and 3, a pinion 48 is mounted on housing body 16 within the central space 44. Pinion 48 meshes with gears 20, 22 and 24 and comprises a pinion shaft 50 which defines a pinion axis of rotation 52. Pinion shaft 50 is supported by a flanged pinion bushing 54 fixedly attached to the housing body 16. In a practical design, a thrust bearing 56 and thrust washers 58 are interposed between the pinion 48 and the housing body 16.

With reference to FIG. 3, pinion 48 is movable relatively to housing 14 in a direction along the pinion axis 52. A projection 60, in this example a crossbar 62 is attached to the pinion 48 and extends transversely to the pinion axis 52. A cut-out 64, defined in the housing body 16, is in facing relation with the projection 60 (crossbar 62). In this example, the cut-out 64 is in the pinion bushing 54 which is fixedly attached to and considered to be part of the housing body 16. Axial motion of the pinion 48 along pinion axis 52 moves the pinion between two positions, a first position wherein the crossbar 62 (projection 60) engages the cut-out 64, and a second position wherein the cross bar 62 is out of engagement with the cut-out 64. When crossbar 62 engages the cut-out 64 the pinion 48 is prevented from rotating about the pinion axis 52; when the cross bar 62 does not engage the cut-out 64 the pinion 48 is free to rotate about the pinion axis 52. One or more springs 66 act between the pinion 48 and the housing body 16 to bias the crossbar 62 into the first position in engagement with the cut-out 64. Rotation of the pinion 48 is permitted when a pipe element 136 is inserted through opening 46 into the central space 44 (see FIG. 2) and held against the pinion 48 to compress the springs 66 and disengage the crossbar 62 from the cut-out 64. To provide contact between the pinion 48 and the pipe element, a cup 68 abuts the pinion shaft 50 and is captured between the cam bodies. In a practical design the cup 68 may be attached to the pinion or free-wheeling. Cup 68 receives and maintains the pipe element in alignment with the pinion 48 so that it may be turned when cold working the pipe element as described below. Cup 68 also helps limit pipe end flare during cold working.

Figure 4:
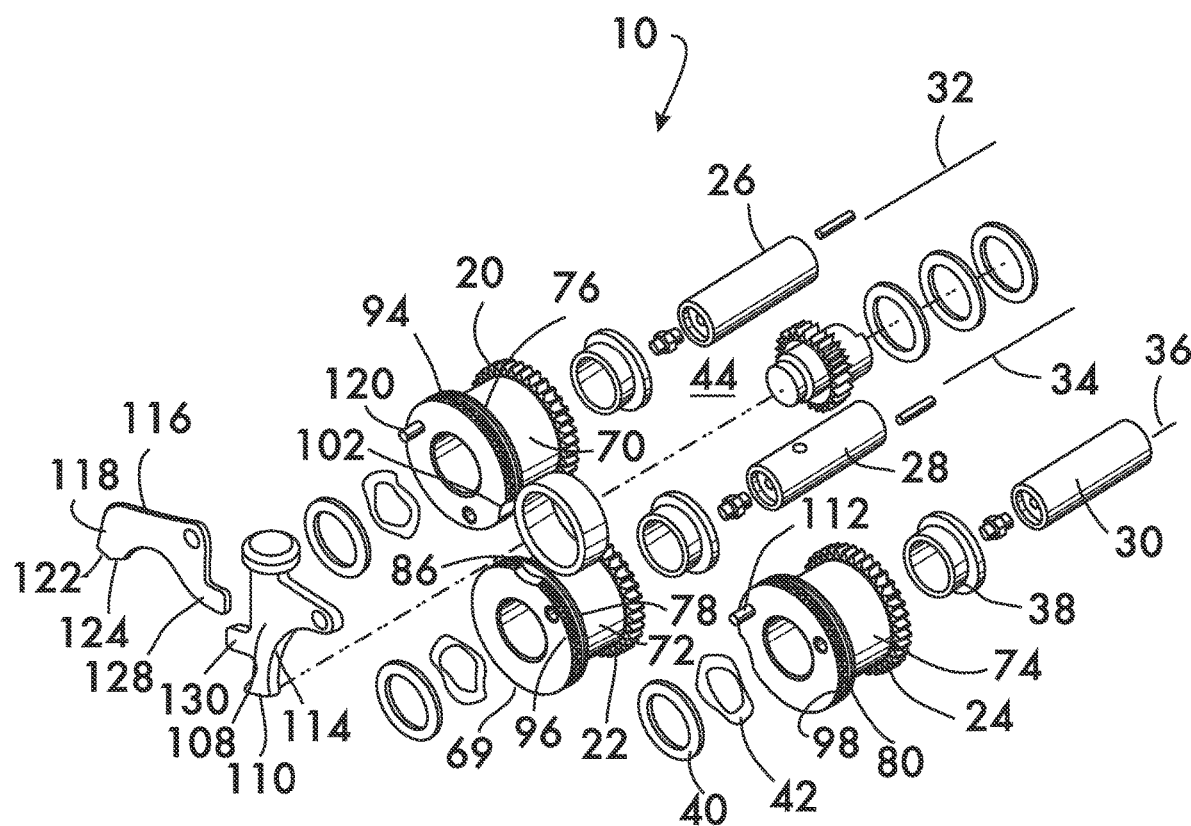
FIG. 4 is an exploded isometric view of components of the device shown in FIG. 1.

As shown in FIG. 4, device 10 comprises a plurality of cams 69, in this example, three cams having respective cam bodies 70, 72 and 74. Each cam body 70, 72 and 74 is mounted on a respective gear 20, 22 and 24. Each cam body 70, 72 and 74 comprises a respective cam surface 76, 78 and 80. Each cam surface 76, 78 and 80 extends around their respective cam body 70, 72 and 74. The cam surfaces 76, 78 and 80 are engageable with a pipe element received within the central space 44.

Figure 4A:
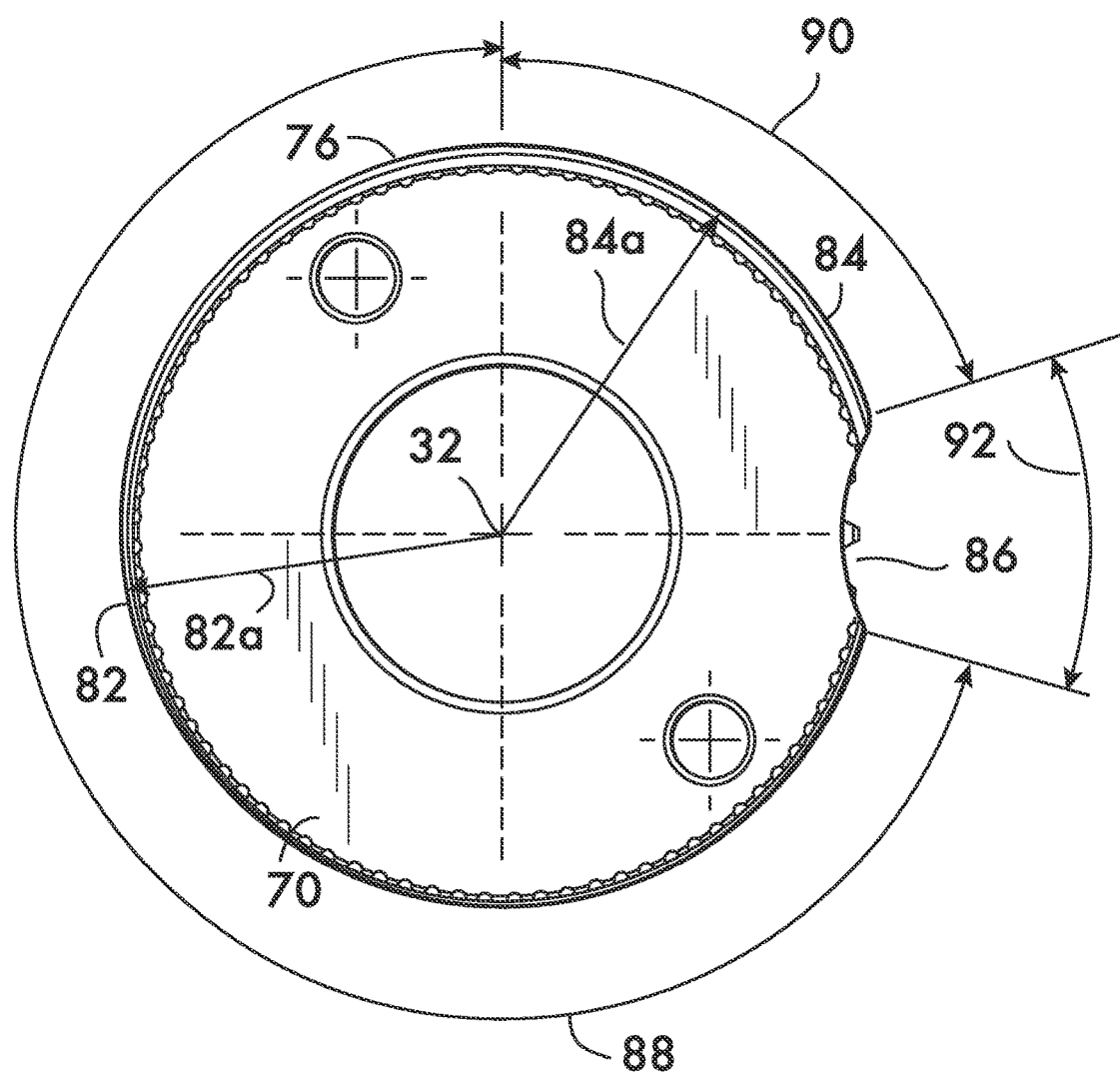
FIG. 4A is an end view of an example cam according to the invention.
Figure 5:
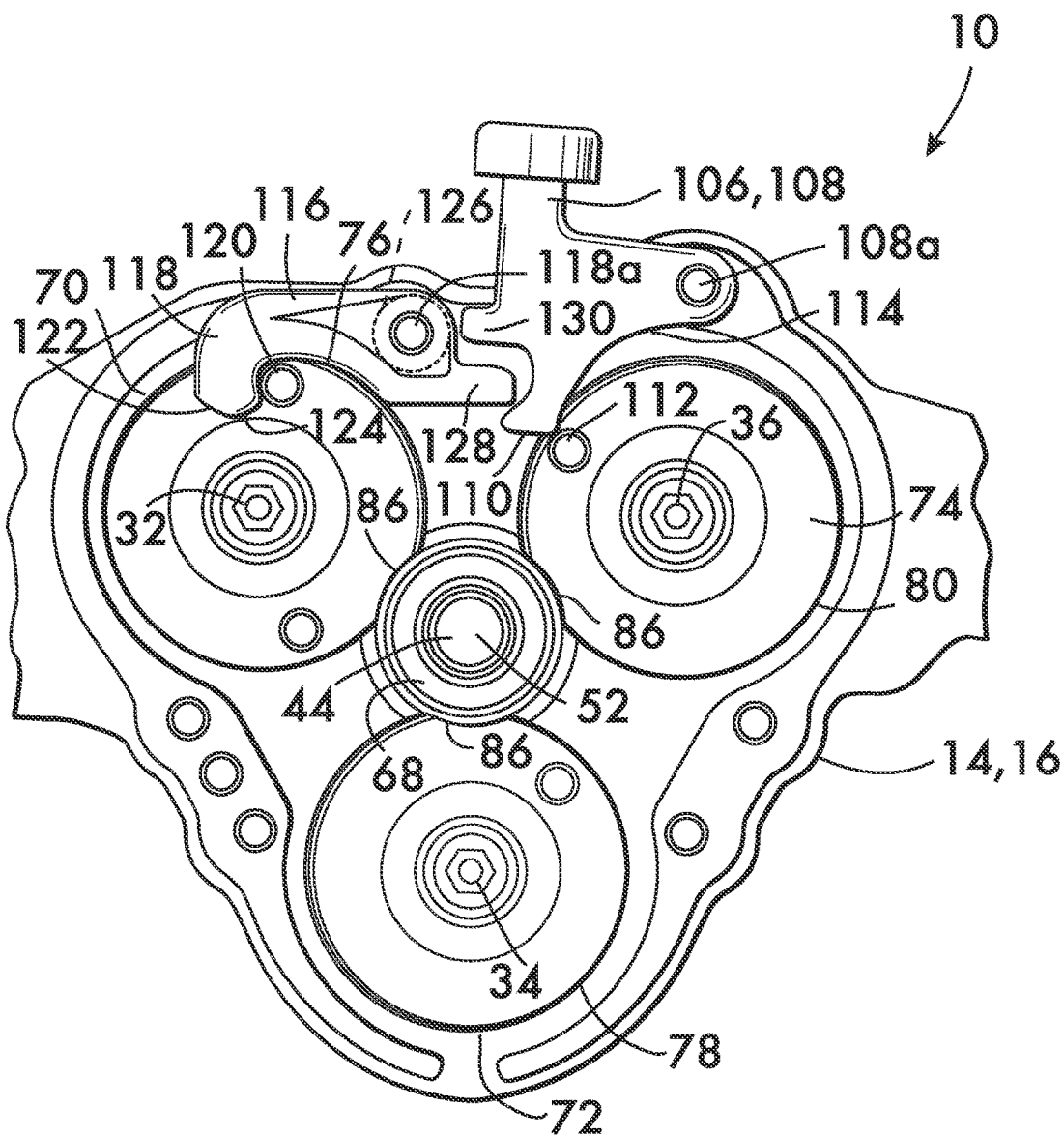
FIG. 5 is a cross sectional view of device 10 taken at line 5-5 of FIG. 1.

As shown in detail in FIG. 4A, each one of the cam surfaces 76, 78, 80 (76 shown) comprises a region 82 of increasing radius 82a and a region of reduced radius 86. In this example embodiment the region of reduced radius 86 comprises a discontinuity. Each one of the cam surfaces may also include a region 84 of constant radius 84a positioned adjacent to the region of reduced radius 86. The radii 82a and 84a (when present) are measured about and from the respective axes of rotation 32, 34 and 36 of the gears 20, 22 and 24 (shown for the cam surface 76, the axis 32 of gear 20). As shown in FIG. 5, the regions of reduced radius 86, when facing the central space, provide clearance permitting insertion of the pipe element into the cup 68. With reference again to FIG. 4A, the example device 10 has three cam bodies 70, 72 and 74. The regions of constant radius 84 extend along an arc length which is at least ⅓ of the circumference of the finished circumferential groove in the pipe element so that the groove may be formed to a uniform radius around the entire circumference of the pipe element during one revolution of each cam body 72, 74 and 76. In an example practical design (see FIG. 4A), the region of increasing radius 82 may subtend an angle 88 of approximately 260°, and the region of constant radius (when present) may subtend an angle 90 of approximately 78°, the region of reduced radius 86 subtending an angle 92 of approximately 22°. For devices 10 having a number of cams other than three and the constraint that the groove be formed to a uniform radius around the entire circumference of the pipe element in one revolution of each of the cams, the arc length of the region of constant radius of each cam body is advantageously 1/N, where "N" is the number of cams in the design. However, it is feasible to reduce or eliminate entirely the region of constant radius. Elimination of this region will reduce the torque required to form the groove.

As shown in FIGS. 4 and 4B, it is advantageous to include at least one traction surface 94 on one of the cam bodies such as 70. In the example device 10 each cam body 70, 72 and 74 has a respective traction surface 94, 96 and 98. The traction surfaces 94, 96 and 98 extend circumferentially around their respective cam bodies 70, 72 and 74 and have a constant radius measured about and from the respective axes of rotation 32, 34 and 36. The cam surfaces 76, 78, 80, are positioned between the gears 20, 22 and 24 and the traction surfaces 94, 96 and 98, the cam surfaces being positioned proximate to the traction surfaces. As shown in FIG. 4B, each traction surface (94 shown) comprises a plurality of projections 100 which extend transversely to the respective axes of rotation 32, 34 and 36. Projections 100 provide mechanical engagement and purchase between the cam bodies 70, 72 and 74 and the pipe element which the traction surfaces engage. Each traction surface 94, 96 and 98 also has a gap 102. Each gap 102 in each traction surface 94, 96 and 98 substantially aligns axially with a respective region of reduced radius 86 in each cam surface 76, 78, 80 to provide clearance permitting insertion and withdrawal of the pipe element into and from the cup 68. In another cam embodiment 69a, shown in FIG. 4C, the traction surface 94 overlies the cam surface 76. The gap 102 in the traction surface 94 is again aligned with the region of reduced radius 86 in the cam surface 76.

As shown in FIG. 5, it is further advantageous to include an actuator 106 to initiate motion of the cam bodies 70, 72 and 74. In this example embodiment, actuator 106 comprises an actuator lever 108 pivotably mounted on the housing body 16. Actuator lever 108 has a first surface 110 which engages a finger 112 on cam body 74 to initiate rotation of the cam body. Finger 112 is offset from the axis of rotation 36 of cam body 74 (see also FIG. 2). The offset of finger 112 allows the actuator lever 108, when pivoted about its pivot axis 108a, to apply a torque to the cam body 74 (gear 24) and rotate it about axis 36. This rotates all of the cam bodies 70, 72 and 74 because their respective gears 20, 22 and 24 mesh with the pinion 48, thus the act of turning any one gear or turning the pinion turns all gears. Actuator lever 108 also has a second surface 114 which is engaged by the finger 112 as the cam body 74 rotates. The second surface 114 is curved in this example and allows the rotating cam body 74 to reset the relative positions of the finger 112 and the actuator lever 108 so that upon one rotation of the cam body 74 the actuator lever 108 is pivoted to a "ready" position as shown in FIG. 6, ready to apply a torque to the cam body and initiate rotation.

It is further advantageous to include a stop 116, movably mounted on housing body 16 to prevent motion of the cam bodies. In this example embodiment, stop 116 comprises a hook 118 pivotably mounted on the housing body 16 and has a pivot axis 118a. Hook 118 engages a finger 120 on cam body 70 (gear 20). Finger 120 is offset from the axis of rotation 32 of cam body 70 (see also FIG. 2). The offset allows the hook 118 to arrest counter clockwise motion of cam body 70 as described below. Tangent surfaces 122 and 124 are positioned at the end of hook 118 for engagement with finger 120 during operation of the device as described below. A torsion spring 126 (see also FIG. 2) acts between the hook 118 and the housing body 16 to bias the hook in a counter clockwise direction around pivot axis 118a. Hook 118 also has a spur 128 which extends to the opposite side of the pivot axis 118a from the hook (see also FIGS. 2 and 4). Actuator lever 108 has a foot 130 which engages spur 128 to pivot the hook 118 out of engagement with finger 120 upon movement of the actuator lever 108 into engagement with the finger 112, forcing the cam 74 counterclockwise to initiate motion of the cam bodies 70, 72 and 74 as described below.

Figure 6:
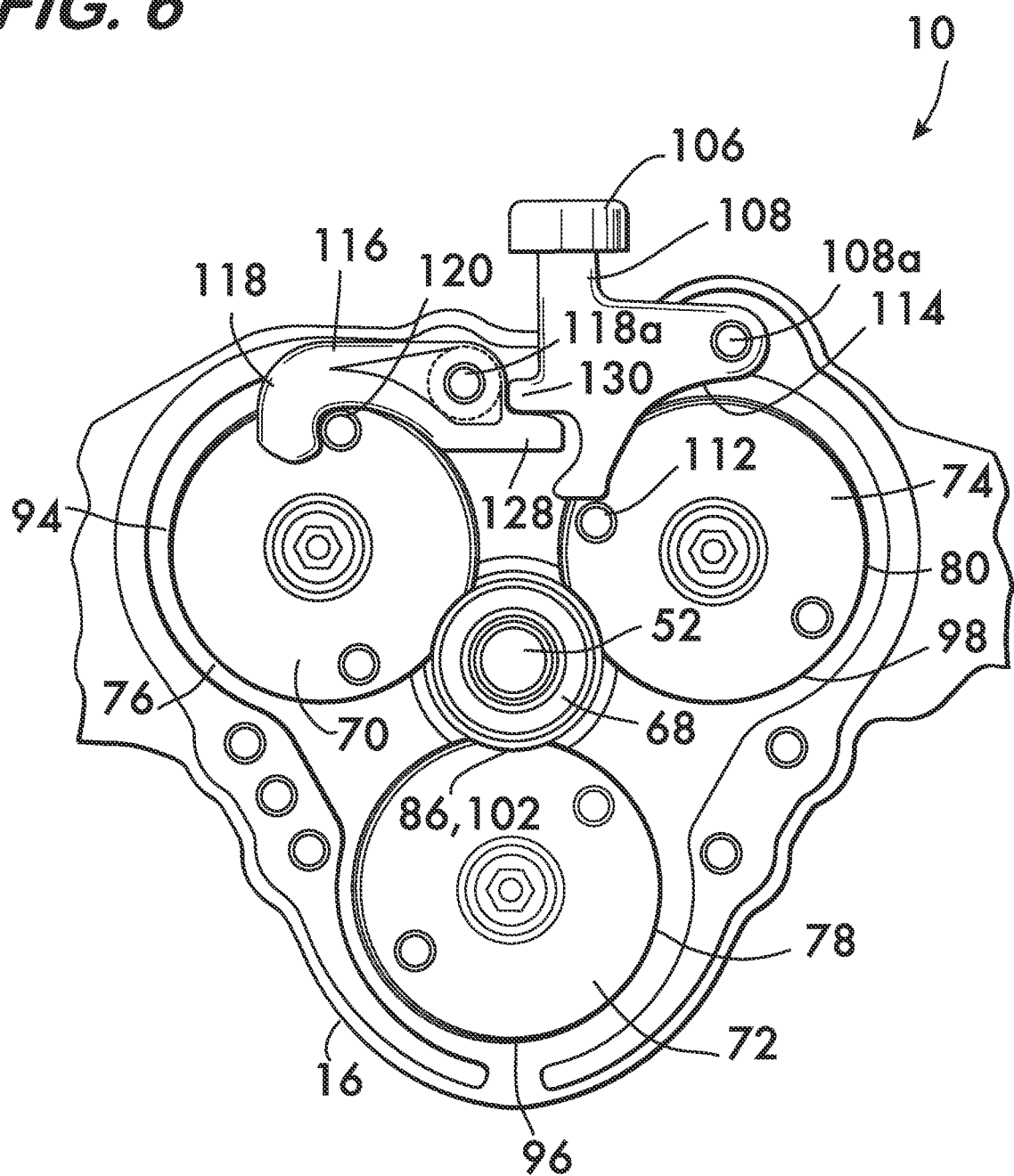

Operation of device 10 begins with the cam bodies 70, 72 and 74 aligned as shown in FIG. 6 such that the regions of reduced radius 86 in the cam surfaces 76, 78 and 80 (see also FIG. 4) and gaps 102 in the traction surfaces 94, 96 and 98 simultaneously face the pinion axis 52. As shown in FIG. 1, device 10 is mounted on tubes 132 extending from one end of the rotating chuck 12. The opening 46 in housing cover 18 faces the chuck 12 (see FIG. 2). Pinion axis 52 is coaxially aligned with the axis of rotation 134 of chuck 12. A pipe element 136 is inserted into the opposite end of the chuck 12 so that the end of the pipe element extends outwardly from the chuck toward device 10. Chuck 12 is tightened to secure the pipe element and the device 10 is then moved along tubes 132 toward and into engagement with the pipe element.

With reference to FIGS. 2 and 4, the pipe element passes through opening 46 and into the central space 44. Aligned regions of reduced radius 86 and gaps 102 provide the clearance necessary to permit the pipe element to pass by cam surfaces 76, 78 and 80 and traction surfaces 94, 96 and 98 to be received in the cup 68. The pipe element is thus aligned with the pinion axis 52. Device 10 is moved further toward chuck 12 (see FIG. 1) so as to cause the pinion 48 to move axially along the pinion axis 52 and compress springs 66 sufficiently to move the cross bar 62 from the first to the second position out of the cut-out 64 in the pinion bushing 54 (see FIG. 9A) to permit rotation of the pinion 48, and consequently rotation of gears 20, 22 and 24 which mesh with it. The chuck 12 is then actuated, which rotates the pipe element clockwise as viewed in FIGS. 5 and 6. Alternately, rotation of the pipe element can be initiated and then the device 10 can be slid into engagement with the pipe element.

Engagement between the pipe element and the cup 68, when the cup is not fixed to the pinion, may cause the cup to rotate clockwise with the pipe. When the cup 68 is freewheeling relative to the pinion 48, the torque transmitted via friction between the cup 68 and the pinion 48 may try to rotate the pinion, and consequently gears 20, 22 and 24.

Motion of the gears is easily prevented by engagement between the hook 118 and the finger 120 extending from cam body 70 (gear 20). There is furthermore no significant engagement between the pipe element and the cam bodies because the regions of reduced radius 86 in the cam surfaces 76, 78 and 80 (see also FIG. 4) and gaps 102 in the traction surfaces 94, 96 and 98 simultaneously face the pinion axis 52 and do not significantly contact the pipe at this time. If the cup 68 is fixedly attached to the pinion 48 then engagement between hook 118 and finger 120 again prevents motion of the gears and pinion, the pipe element merely rotates within the cup.

Figure 7:
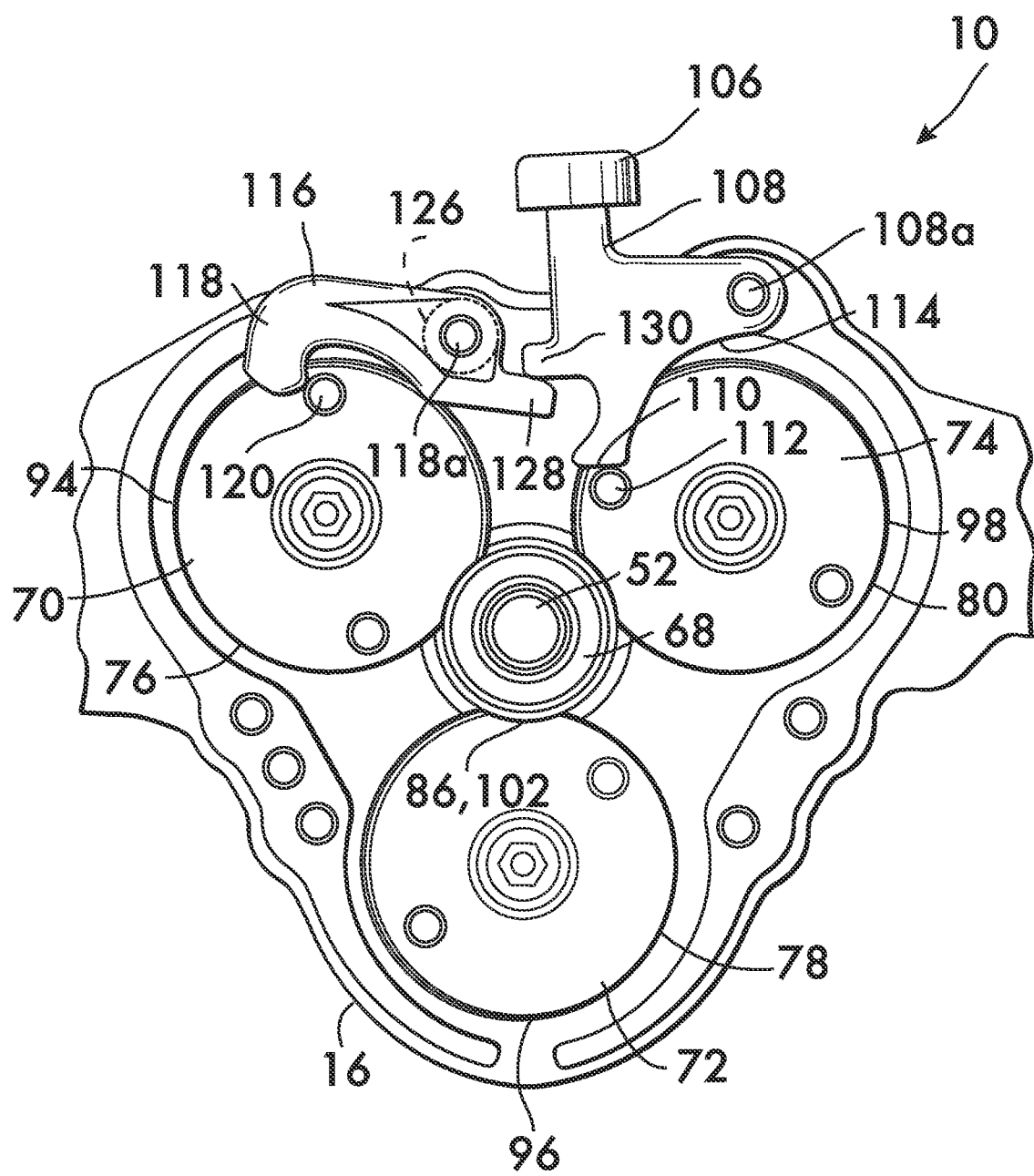
Figure 8:
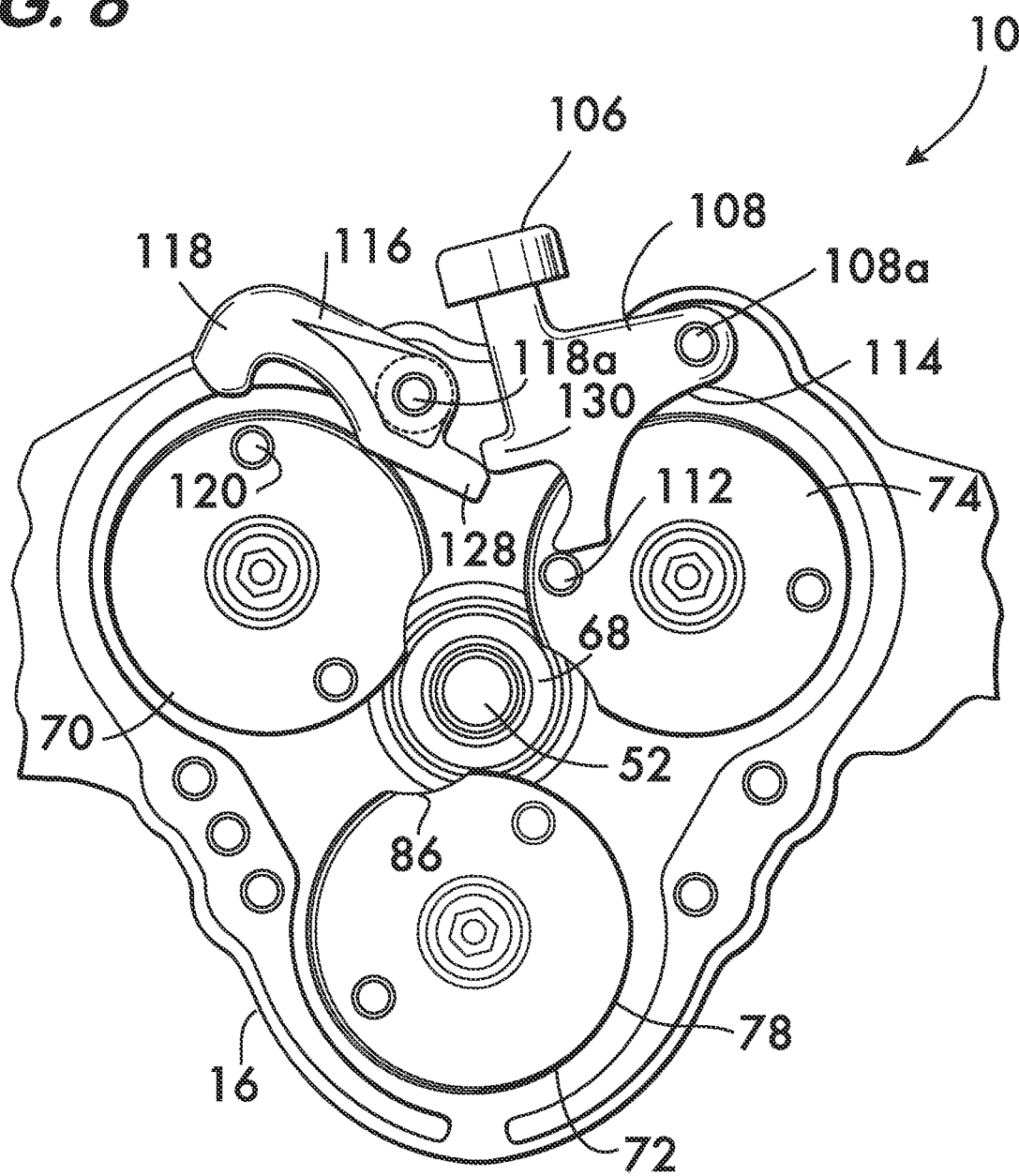

To initiate gear and cam body rotation, actuator lever 108 is depressed, causing it to pivot counterclockwise about its axis 108a as viewed in FIG. 6. As shown in FIG. 7, pivoting of actuator lever 108 causes its first surface 110 to engage the finger 112 extending from cam body 74, and also causes the foot 130 to engage the spur 128 of the hook 118. Hook 118 pivots clockwise about its axis 118a and winds its biasing spring 126 (see also FIG. 2). The geometry of the actuator lever 108, hook 118 and its spur 128 is designed such that finger 120 on cam body 70 is released from the hook 118 as torque is applied to rotate cam body 74 via engagement of the first surface 110 of actuator lever 108 with finger 112. FIG. 7 shows finger 120 on the verge of release from hook 118 and cam body 74 just before engagement with the pipe element. As shown in FIGS. 8 and 4, further pivoting of the actuator lever 108 pivots the hook 118 and releases the finger 120 from hook, (thereby permitting motion of the gear 20) while applying torque to the cam body 74 (gear 24) to initiate rotation of the pinion 48 and gears 20, 22 and 24 and their associated cam bodies 70, 72 and 74. The cam bodies rotate counter clockwise and their cam surfaces 76, 78 and 80 and traction surfaces 94, 96 and 98 engage the outer surface of the pipe element. The cam bodies 70, 72 and 74 are then driven by the rotating pipe element. The regions of increasing radius 82 (see FIG. 4A) of the cam surfaces 76, 78 and 80 first engage the pipe element and begin to form a circumferential groove in it as the cam bodies 70, 72 and 74 rotate. The traction surfaces 94, 96 and 98 (see FIG. 4B) also engage the pipe element and provide mechanical engagement which prevents slippage between the cam surfaces 76, 78 and 80 and the pipe element. As the radius at the point of contact between the cam surfaces and the pipe element increases, the groove radius is made smaller until the point of contact transitions to the region of constant radius 84 (FIG. 4A) of each cam surface 76, 78 and 80. For a device 10 having three cam bodies with respective regions of constant radius, each region of constant radius 84 extends over at least ⅓ of the circumference of the finished circumferential groove in the pipe element. The radius of the region of constant radius is designed to impart the final desired groove radius to the circumferential groove in the pipe element at a uniform radius around the entire circumference of the pipe element with one revolution of all three cam bodies. Alternately, when the regions of constant radius are not present on the cams, the groove radius is not uniform, but form separate partial spirals, one for each cam. Although not uniform, the radius of the groove falls within the necessary tolerances for the groove's intended use.

Figure 9A:
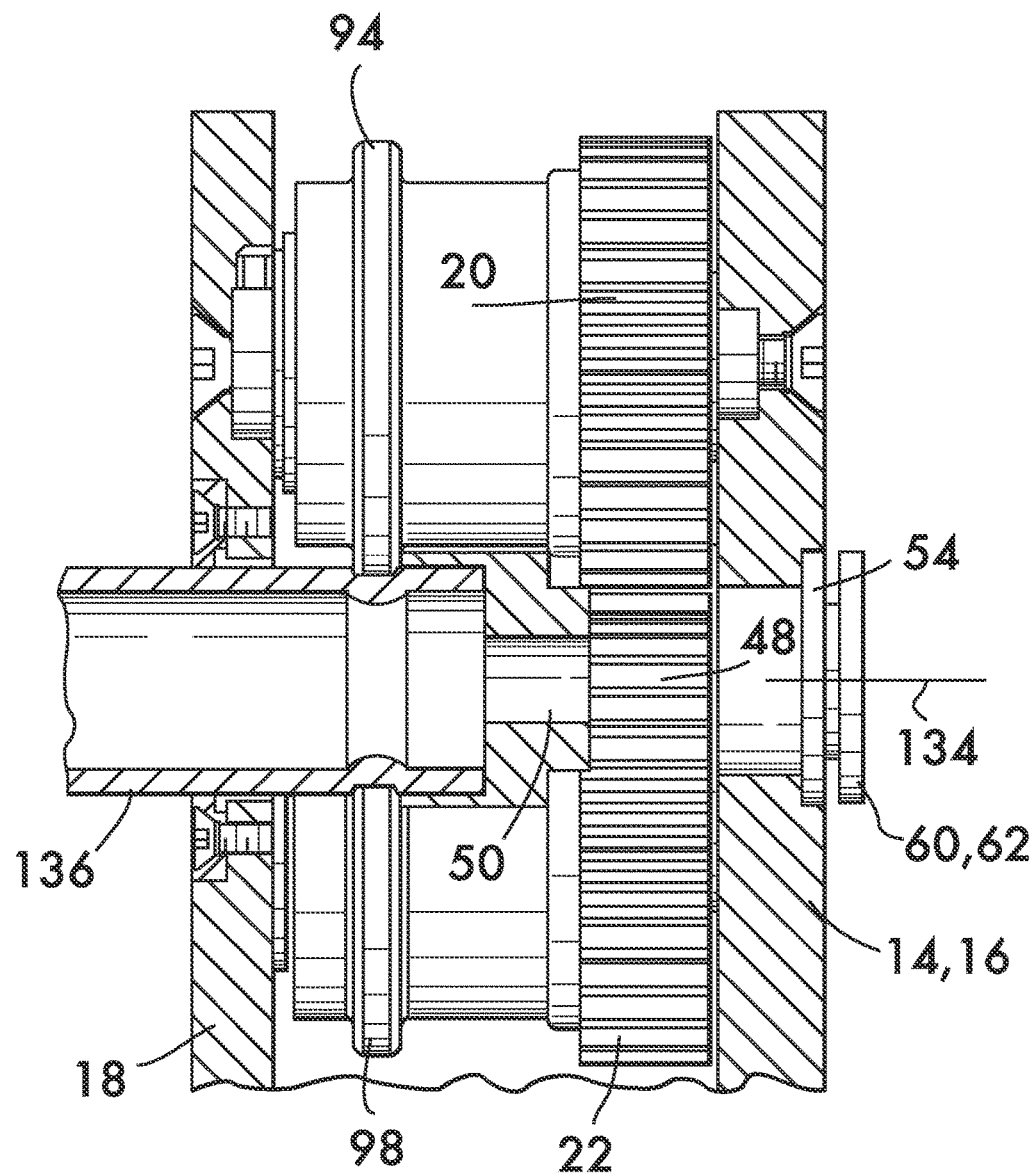

As shown in FIGS. 9 and 9A, cam body 74 nears completion of its single revolution and the finger 112 contacts the second (curved) surface 114 of the actuator lever 108. Interaction between finger 112 and surface 114 causes the actuator lever 108 to pivot clockwise about its pivot axis 108a and return to the starting position shown in FIG. 6. Hook 118 follows, biased by the spring 126 to pivot counterclockwise into a position ready to receive the finger 120. When continued rotation of cam body 70 occurs it moves finger 120 into hook 118 which stops motion of the gears 20, 22 and 24. It is also feasible to design spring 126 to have sufficient stiffness such that it will pivot both the hook 118 and the actuator lever 108 back into the start position shown in FIG. 6 when the actuator lever is released. Upon completion of groove formation the chuck 12 is stopped and the pipe element, now grooved, may be removed from device 10.

Figure 10:
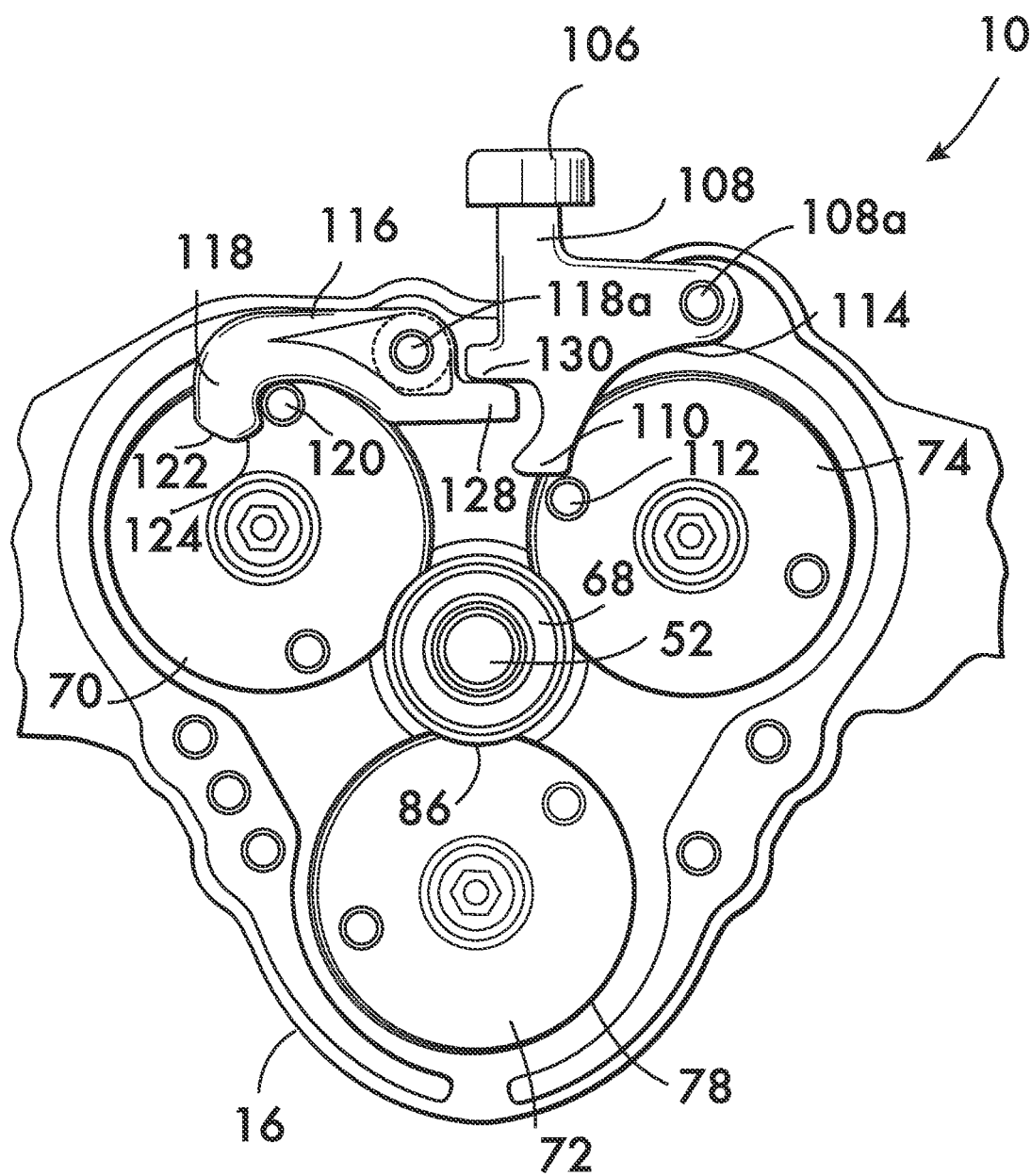
FIGS. 10-12 are cross sectional views illustrating a safe reverse mode of the device 10 when a pipe element is rotated in the wrong direction.
Figure 11:
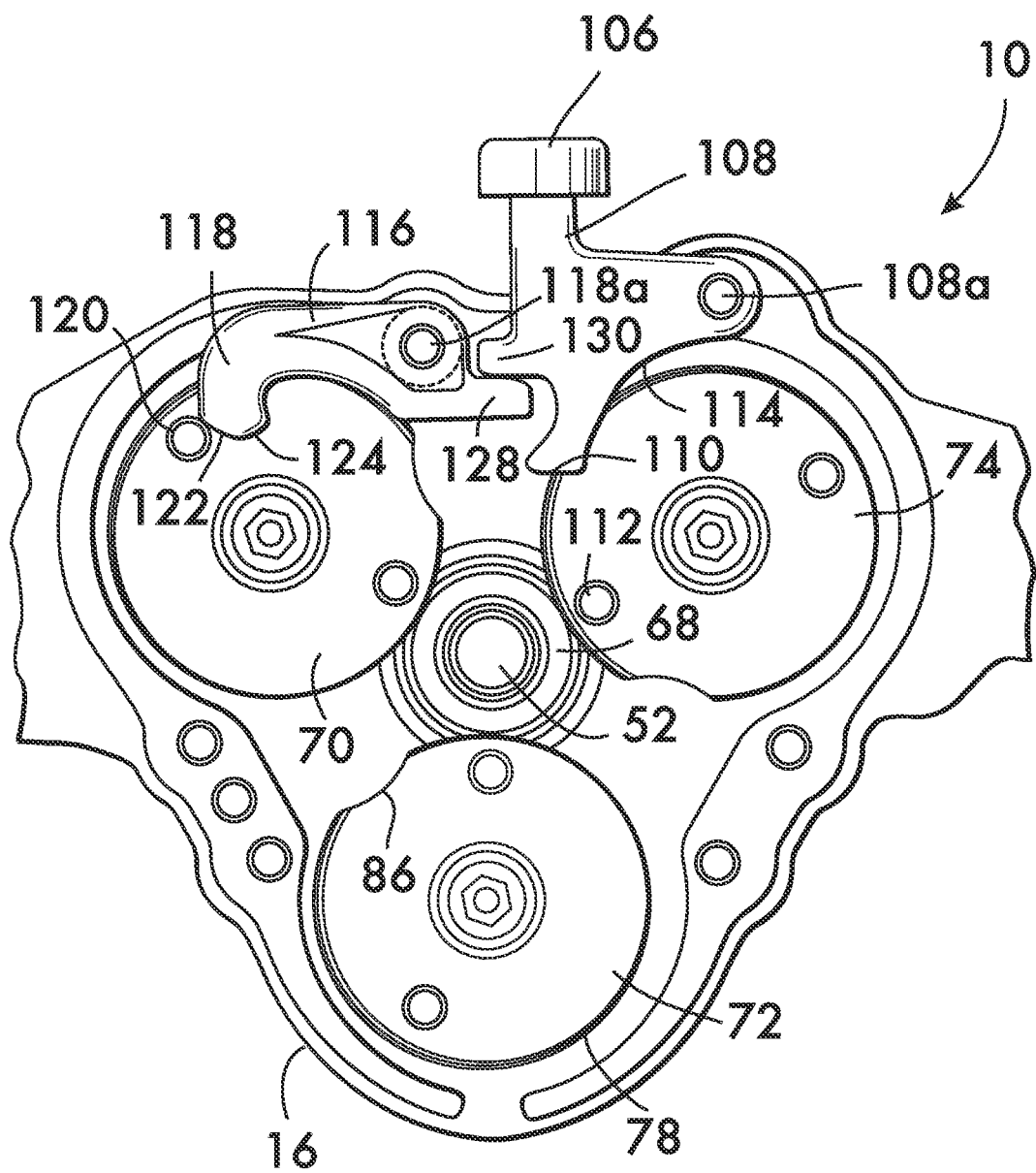
Figure 12:
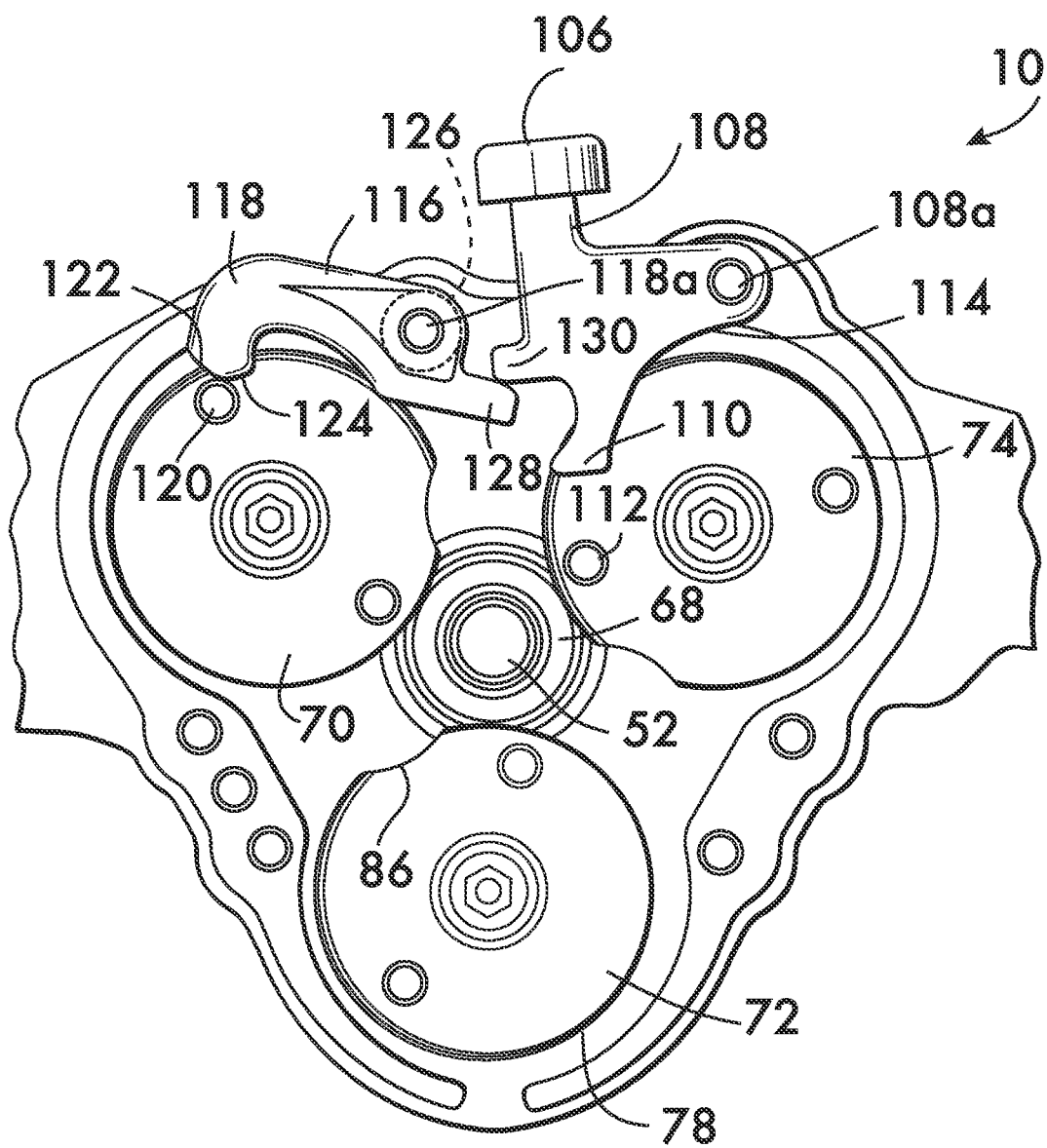

FIGS. 10-12 illustrate an anomalous condition wherein the pipe element is inadvertently rotated counterclockwise. This may happen due to operator error, as power chucks such as the Ridgid 300 are capable of applying significant torque in both directions.

If reverse torque (i.e., torque which will rotate the pipe element counterclockwise as viewed in FIG. 10) is applied before the pipe element has been grooved, the pipe element will merely rotate relative to the cam bodies 70, 72 and 74 and their associated gears 20, 22 and 24 because the regions of reduced radius 86 in the cam surfaces 76, 78 and 80 (see also FIG. 4) and gaps 102 in the traction surfaces 94, 96 and 98 simultaneously face the pinion axis 52 and thus neither surface contacts the pipe element. Additionally the ends of the regions of reduced radius in the cam surfaces, being at the end of the region of constant radius 84, are too steep for the pipe element to climb through frictional contact even if the pipe element and the cam surfaces come into contact. Depressing the actuator lever 108 will have no significant effect, as this action will try to rotate the cams and gears in the opposite direction from how the pipe element, rotating under reverse torque, will try to turn the cam bodies via friction between the cup 68 and pinion 48 when the cup is not fixedly attached to the pinion.

However, if reverse torque is inadvertently applied after a pipe element has been grooved, the regions of constant radius 84 of the cam surfaces 76, 78 and 80 are at approximately the same radius as the floor of the groove and thus will gain purchase and rotate the cam bodies 70, 72 and 74 clockwise. The torque on the cam bodies (and their associated gears 20, 22 and 24) will be augmented when the pipe element further contacts the traction surfaces 94, 96 and 98. As significant torque is applied to the pipe element, measures are taken to prevent damage to the device 10.

FIGS. 10-12 illustrate the condition wherein reverse torque is applied to a pipe element which has already been grooved. As shown in FIG. 10, the cam bodies 70, 72 and 74 are driven clockwise. The finger 120 on cam body 70 is moved away from the hook 118, but the finger 112 of cam body 74 is driven against the actuator lever 108. Actuator lever 108 is free to pivot clockwise in response to this applied force, the pivoting motion allowing the finger 112 to fall off of the first surface 110 of the actuator lever 108 and engage the second (curved) surface 114, thereby avoiding any damage to device 10. As shown in FIG. 11, the cam bodies continue to rotate clockwise and the finger 120 of cam body 70 comes into contact with the first of the two tangent surfaces 122 and 124 on the end of hook 118. As shown in FIG. 12, the first tangent surface 122 is angularly oriented such that it permits the finger 120 to pivot the hook 118 clockwise against its biasing spring 126 in response to the force applied by the finger 120. Pivoting motion of the hook 118 further prevents damage to the device 10. As the finger 120 transitions to the second tangent surface 124 the hook 118 is permitted to pivot counterclockwise under the force of its biasing spring 126 and move again to the ready position shown in FIG. 10, as does the finger 112 on cam body 74. This motion will repeat until the motion of the pipe element is stopped.

Figure 13:
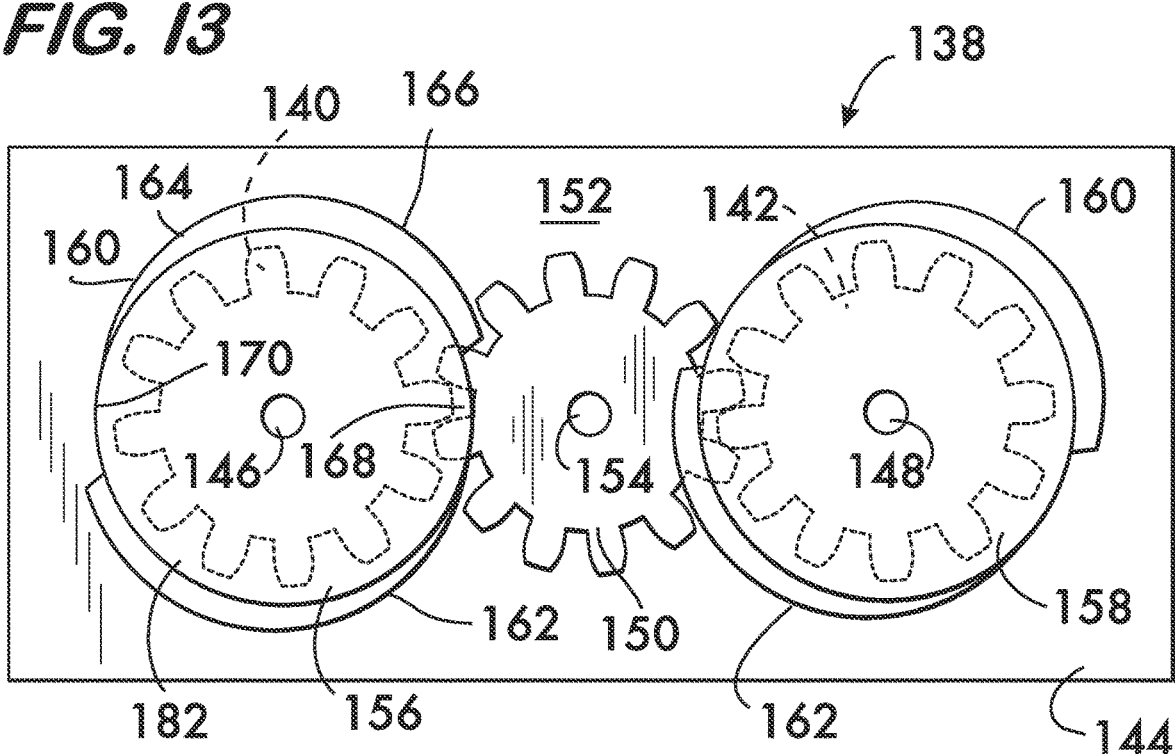
FIG. 13 is a partial view of another example embodiment of a device according to the invention.

FIG. 13 shows another example embodiment of a device 138 according to the invention having at most two gears 140, 142. Gears 140, 142 are mounted within a housing 144 for rotation about respective axes 146, 148. A pinion 150 is mounted on housing 144 within a central space 152 which receives a pipe element for processing. Pinion 150 meshes with gears 140, 142 and rotates about a pinion axis 154.

Figure 14:
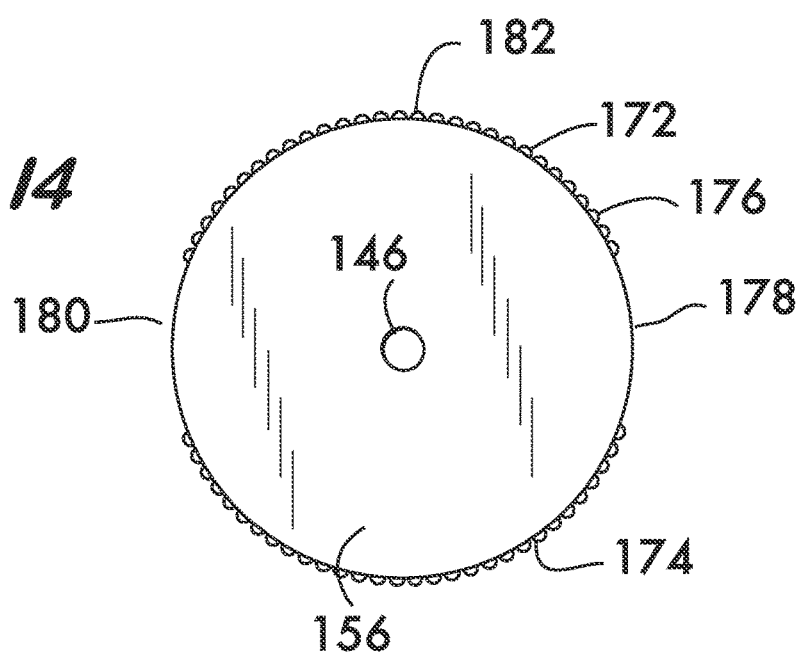
FIG. 14 is an end view of another example cam according to the invention.

Cam bodies 156, 158 are respectively mounted on gears 140, 142. As shown in FIG. 14, each cam body (156 shown) comprises a plurality of cam surfaces, in this example, two cam surfaces 160 and 162. Other cam embodiments, including cams having a single cam surface or cams having more than two cam surfaces are also feasible. The cam surfaces 160 and 162 extend around the respective cam bodies 156 and 158 and are engageable with the pipe element received within the central space 152. The cam surfaces 160 and 162 are circumferentially aligned with one another. Each cam surface 160, 162 comprises a respective region of increasing radius 164 and a region of constant radius 166. The radii are respectively measured about and from the axes of rotation 146 and 148. Respective regions of reduced radius 168, 170 are positioned between each cam surface 160, 162 on each cam body 156, 158.

As further shown in FIG. 14, a plurality of traction surfaces, in this example two traction surfaces 172, 174, extend around each cam body 156, 158 (156 shown). Traction surfaces 172, 174 are circumferentially aligned with one another in this example. Traction surfaces 172, 174 each comprise a plurality of projections 176 which extend transversely to respective axes of rotation 146, 148. Respective gaps 178, 180 are positioned between each traction surface 172, 174 on each cam body 156, 158. Gaps 178, 180 are respectively aligned with regions of reduced radius 168, 170 in the cam surfaces 160, 162. As in the earlier discussed embodiment, the cam surfaces 160, 162 on each cam body 156, 158 may be positioned, between the respective gears 140, 142 and the traction surfaces 172, 174, and the cam surfaces may be located proximate to the traction surfaces on each cam body.

Cams having a plurality of cam surfaces and traction surfaces are sized so that they form a complete circumferential groove for a fraction of a rotation. For example, cams 182 as illustrated in FIGS. 13 and 14 having at most two cam surfaces and two traction surfaces form a complete circumferential groove in one half a revolution of the cams.

Although devices having 2 and three cams are illustrated herein, designs having more than three cams are advantageous for forming grooves having a consistent radius, especially in pipe elements having a nominal pipe size of 2 inches or greater, or for pipe elements of any size having a variety of wall thicknesses.

Figure 15:
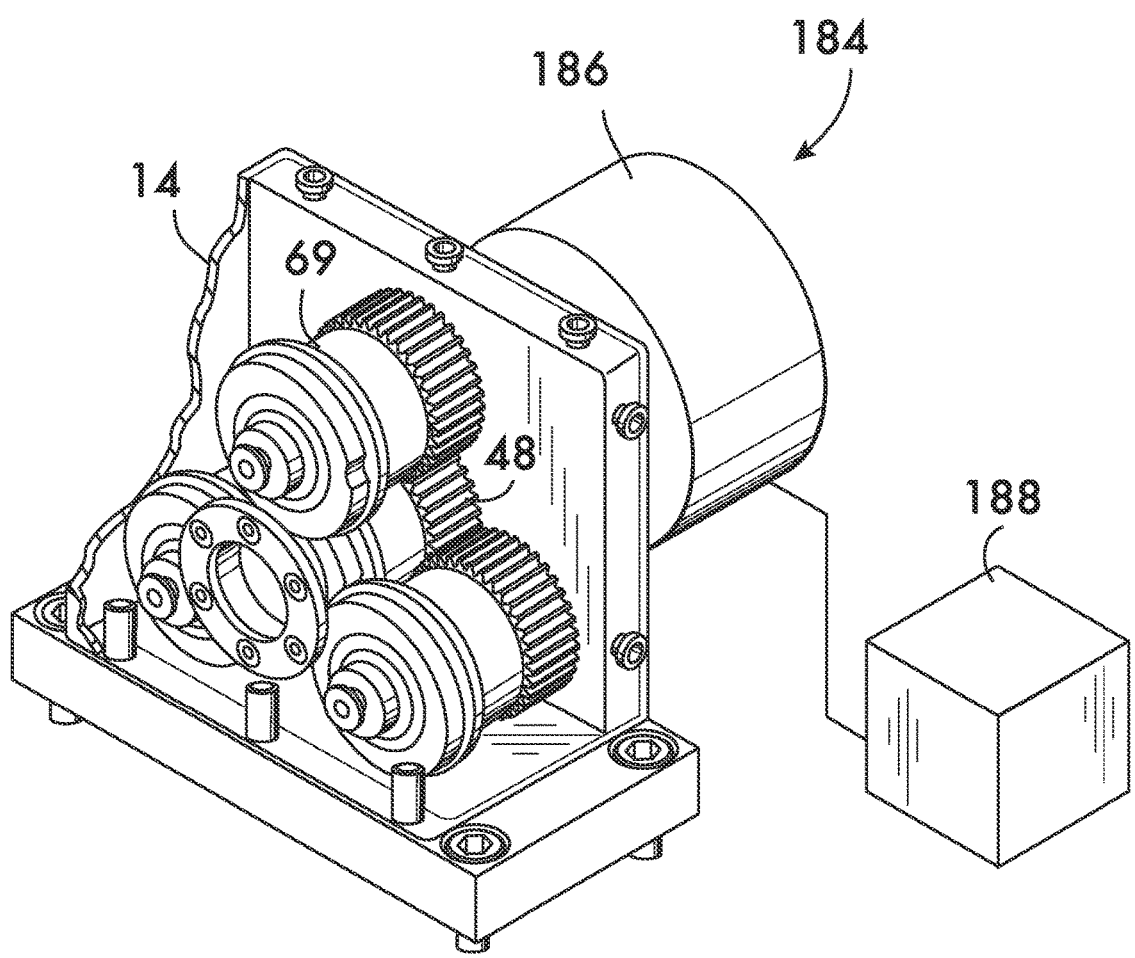
FIGS. 15 and 16 are isometric views of example embodiments of devices according to the invention.

FIG. 15 shows another embodiment 184 of a device for cold working pipes. Embodiment 184 comprises a housing 14 in which cams 69 (shown) or cams 182 are rotatably mounted and mesh with a pinion 48. In this embodiment an electrical motor 186 is coupled to the pinion, either directly or through a gear box. In this arrangement it is advantageous if the electrical motor 186 is a servomotor. A servomotor allows for precise control of the number of revolutions of the cams 69 so that the regions of reduced radius in the cam surfaces and the gaps in the traction surfaces are aligned at the beginning and end of the grooving procedure so that the pipe element can be inserted and removed easily. Control of the servomotor is effected using a programmable logic controller 188 or other similar microprocessor based computer.

Figure 16:
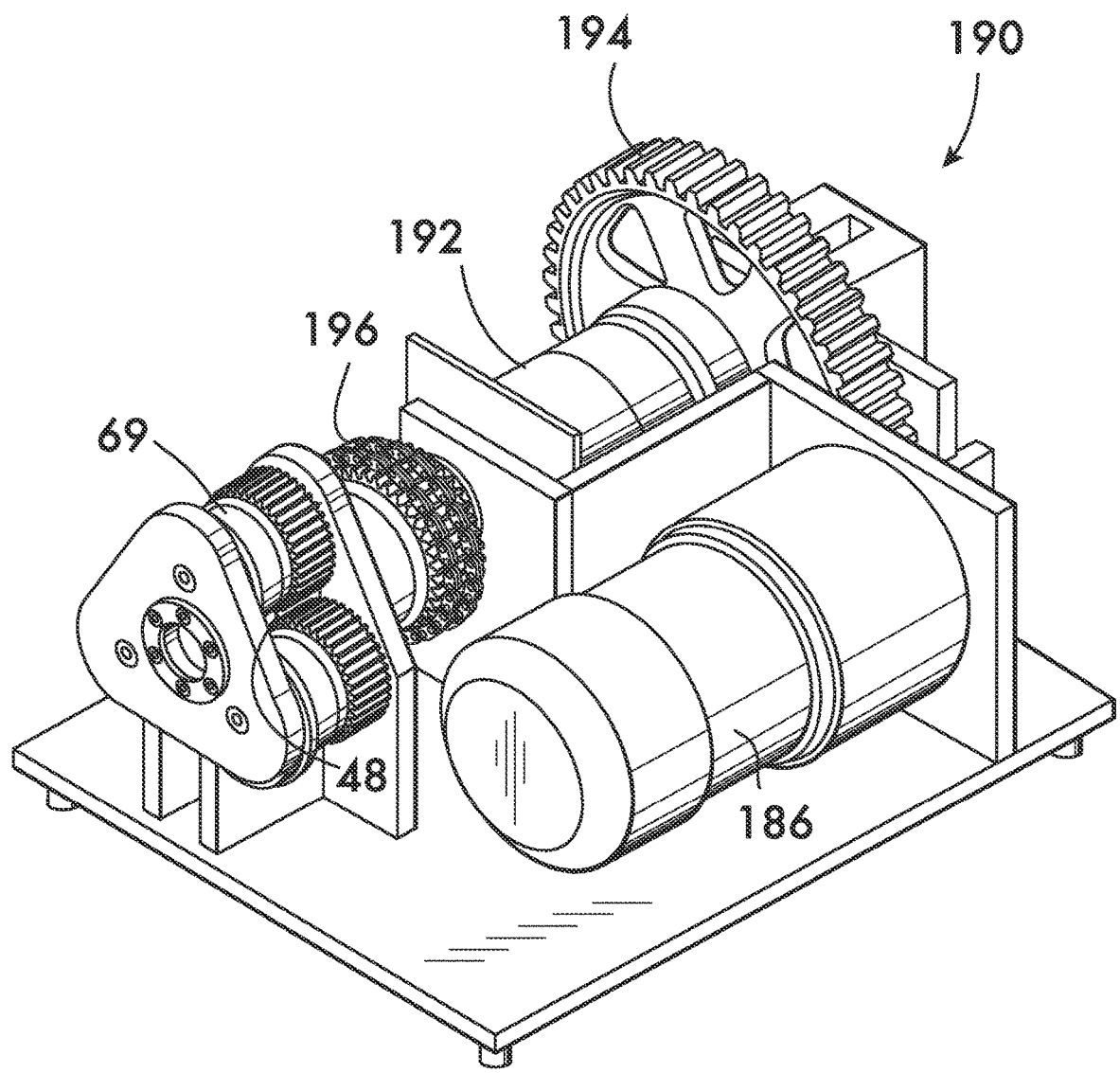

FIG. 16 illustrates another device embodiment 190 wherein a clutch 192 operates between the electrical motor 186 and the pinion 48. In this example, motor 186 is coupled to the clutch 192 through a reduction gear 194. The clutch 192 engages the pinion 48 through a link chain shaft coupling 196 which compensates for misalignment between the clutch and the pinion. Clutch 192 is a wrapped spring type, examples of which are commercially available from Inertia Dynamics of New Hartford, CT. Wrapped spring clutches are readily adjustable to engage and disengage automatically as needed to produce a desired number of revolutions of pinion 48 to achieve a number of revolutions of the cams 69 required to form a circumferential groove and have the regions of reduced radius of the cam surfaces and gaps in the traction surfaces facing the pinion at the end of the grooving process.

Figure 17:
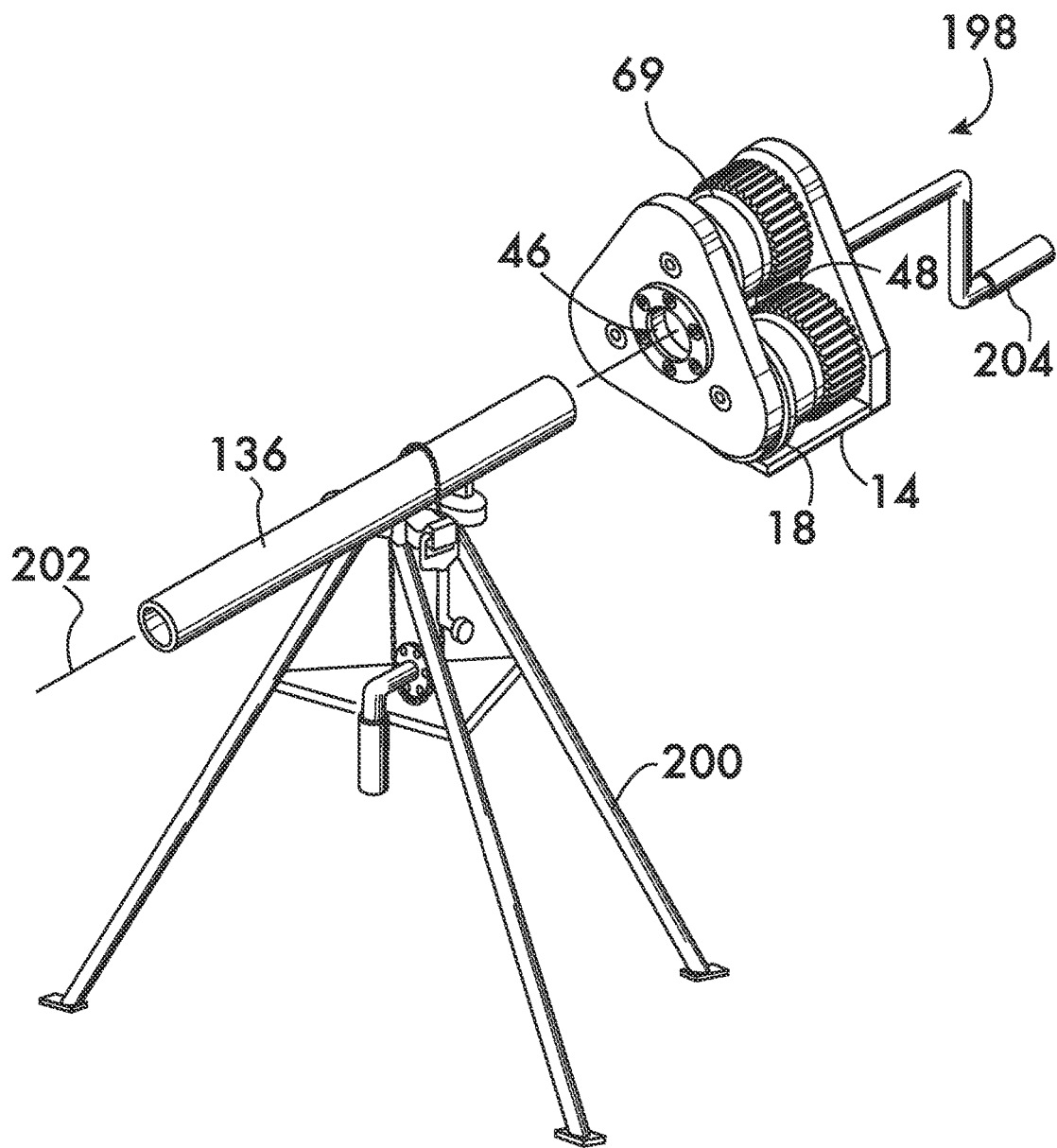
FIG. 17 is an isometric view of another example embodiment of a device according to the invention.

FIG. 17 illustrates another example device embodiment 198 wherein the device is supported directly on the pipe element 136 being cold worked. Pipe element 136 is, in turn, supported on a pipe vise 200 or other convenient support means which will prevent the pipe element from turning when torque is applied about its axis 202. Device 198 is substantially similar to device 10 described above, but has a crank 204 coupled with the pinion 48 for manually turning the pinion, and thereby gears 20, 22 and 24 and their associated cam bodies 70, 72, 74, cam surfaces 76, 78, 80 and traction surfaces 94, 96, 98 (see also FIG. 2) to form a groove of uniform radius over the entire circumference of the pipe element 136. Crank 204 may be coupled to the pinion 48 by directly engaging the pinion shaft 52 (a "direct" coupling between the crank and the pinion), or a gear train (not shown) may be interposed between the crank and the pinion shaft to reduce the torque required for manual operation.

In operation (see FIGS. 2 and 17) the pipe element 136 is affixed to the pipe vise 200 and the opening 46 in the cover 18 of the housing 14 is aligned with the pipe axis 202. The opening 46 is then engaged with the pipe element 136 and the housing 14 is slid onto the pipe element, which enters the central space 44 and is received within the cup 68 to seat the end of the pipe element 136 to the proper depth within the device 198 so that the groove is formed at the desired distance from the end of the pipe element. Optionally, to ensure proper pipe element seating, device 198 may be equipped with the axially movable pinion 48 as described above. When this feature is present the housing 14 is further forced toward the pipe element to move the pinion 48 axially and disengage the cross bar 62 from the cut-out 64 to permit the pinion to rotate relatively to the housing 14, thus ensuring proper seating of the pipe element 136 within device 198. Turning of the crank 204 will then turn the pinion 48, which will turn the cams 69 through the gears 20, 22 and 24 meshing with the pinion 48. Rotation of the gears engages the cam surfaces 76, 78 and 80 and the traction surfaces 94, 96 and 98 with the pipe element and the device 198 rotates about the pipe element 136 to form a circumferential groove of uniform radius. Upon one rotation of the cams 69 the groove is complete, and this condition is signaled to the operator by an abrupt decrease in the torque required to turn the crank 204. With the gaps 102 in the traction surfaces and the regions of reduced radius 86 in the cam surfaces facing the pipe element 136, clearance is provided and the device 198 may be removed from the pipe element. The grooved pipe element may then be removed from the vise 200.

Devices according to the invention are expected to operate effectively and cold work pipe elements to the desired dimensional tolerances with precision while operating more quickly and simply without the need for operator intervention.

What is claimed is:

1. A device for cold working a pipe element, said device comprising:
   a housing;
   a plurality of gears mounted within said housing, each one of said gears being rotatable about a respective one of a plurality of axes of rotation, said gears being positioned about a central space for receiving said pipe element;
   a plurality of cam bodies, each said cam body mounted on a respective one of said gears;
   a plurality of cam surfaces, each one of said cam surfaces extending around a respective one of said cam bodies and being engageable with said pipe element received within said central space, each one of said cam surfaces comprising a region of increasing radius and a region of reduced radius;
   a pinion mounted within said central space within said housing, said pinion meshing with said plurality of gears and being rotatable about a pinion axis.

2. The device according to claim 1, wherein each of said cam surfaces further comprises a region of constant radius positioned adjacent to a respective one of said regions of reduced radius.

3. The device according to claim 1, wherein said regions of reduced radius comprise respective discontinuities of said cam surfaces.

4. The device according to claim 1, further comprising at least one traction surface extending around one of said cam bodies, said at least one traction surface comprising a plurality of projections extending transversely to said axis of rotation of said one cam body, said at least one traction surface having a gap therein, said gap being aligned axially with said region of reduced radius of said cam surface surrounding said one cam body.

5. The device according to claim 4, further comprising a plurality of said traction surfaces, each one of said traction surfaces extending around a respective one of said cam bodies, each one of said traction surfaces comprising a plurality of said projections extending transversely to a respective one of said axes of rotation, each one of said traction surfaces having a gap therein, each said gap being aligned axially with a respective one of said regions of reduced radius of one of said cam surfaces on each one of said cam bodies.

6. The device according to claim 1, wherein said at least one traction surface overlies one of said cam surfaces.

7. The device according to claim 1, wherein said at least one traction surface is positioned on said one cam body in spaced relation to said cam surface extending around said one cam body.

8. The device according to claim 1, comprising at most, three said gears, each said gear comprising one of said cam bodies and said cam surfaces.

9. The device according to claim 1, comprising at most, two said gears, each said gear comprising one of said cam bodies and said cam surfaces.

10. The device according to claim 4, wherein said one cam surface is positioned between said gear and said at least one traction surface of said one cam body.

11. The device according to claim 10, wherein said one cam surface is positioned proximate to said at least one traction surface of said one cam body.

12. The device according to claim 1, further comprising
   at least one projection attached to said pinion, said at least one projection extending transversely to said pinion axis;
   at least one cut-out defined by said housing, said at least one cut-out positioned in facing relation with said projection; wherein
   said pinion is movable relatively to said housing along said pinion axis between a first position, wherein said projection engages said cut-out thereby preventing continuous rotation of said pinion, and a second position, wherein said projection is out of engagement with said cut-out thereby permitting continuous rotation of said pinion.

13. The device according to claim 12, further comprising a spring acting between said pinion and said housing to bias said pinion into said first position.

14. The device according to claim 1, further comprising a cup abutting said pinion, said cup receiving said pipe element upon insertion of said pipe element into said central space.

15. The device according to claim 14, wherein said cup is fixedly attached to said pinion.

16. The device according to claim 14, wherein said cup is free-wheeling relatively to said pinion.

17. The device according to claim 1, further comprising:
   a first finger extending from a first one of said cam bodies in a direction offset from a first one of said axes of rotation about which said first one of said cam bodies rotates;
   an actuator movably mounted on said housing, said actuator being movable into engagement with said first finger for rotating said first one of said cam bodies about said first one of said axes of rotation.

18. The device according to claim 15, wherein said actuator comprises a lever pivotably mounted on said housing, said lever having a first surface engageable with said first finger for rotating said first one of said cam bodies about said first one of said axes.

19. The device according to claim 18, wherein said lever has a second surface engageable with said finger for pivoting said lever into a ready position upon rotation of said first one of said cam bodies.

20. The device according to claim 17, further comprising:
   a second finger extending from a second one of said cam bodies in a direction offset from a second one of said axes of rotation about which said second one of said cam bodies rotates;
   a stop movably mounted on said housing, said stop being movable into engagement with said second finger for preventing rotation of said second one of said cam bodies about said second one of said axes of rotation; wherein
   upon movement of said actuator into engagement with said first finger, said stop further being movable out of engagement with said second finger for permitting rotation of said second one of said cam bodies.

21. The device according to claim 20, wherein said stop comprises a hook pivotably mounted on said housing, said hook having a spur extending therefrom and engageable with said actuator for rotating said hook out of engagement with said second finger upon movement of said actuator.

22. The device according to claim 1, further comprising a chuck for receiving said pipe element, said chuck being rotatable about a chuck axis, said chuck axis being arranged coaxially with said pinion axis.

23. The device according to claim 22, wherein said housing is pivotably and slidably mounted adjacent to said chuck.

24. The device according to claim 1, further comprising an electrical motor engaged with said pinion.

25. The device according to claim 24, wherein said electrical motor comprises a servomotor, said device further comprising a controller in communication with said servomotor for controlling the number of rotations of said servomotor and thereby said cam bodies.

26. The device according to claim 24, further comprising a clutch operating between said electrical motor and said pinion for controlling the number of rotations of said pinion and thereby said cam bodies.

27. The device according to claim 1, further comprising a crank coupled with said pinion, said crank for manually turning said pinion and thereby said gears.

28. The device according to claim 27, wherein said crank is directly coupled with said pinion.

29. A device for cold working a pipe element, said device comprising:
   a housing;
   a plurality of gears mounted within said housing, each one of said gears being rotatable about a respective one of a plurality of axes of rotation, said gears being positioned about a central space for receiving said pipe element;
   a plurality of cam bodies, each said cam body mounted on a respective one of said gears;
   a plurality of cam surfaces extending around each said cam body, each said cam surface comprising a region of reduced radius and a region of increasing radius, said region of increasing radius extending partially around said cam body and being engageable with said pipe element received within said central space, all of said cam surfaces on each said cam body being circumferentially aligned with one another;
   a pinion mounted within said central space within said housing, said pinion meshing with said plurality of gears and being rotatable about a pinion axis.

30. The device according to claim 29, wherein said regions of reduced radius comprise discontinuities of said cam surfaces positioned between each of said cam surfaces on each said cam body.

31. The device according to claim 29, wherein each of said cam surfaces further comprises a region of constant radius positioned adjacent to a respective one of said regions of reduced radius.

32. The device according to claim 29, further comprising:
   a plurality of traction surfaces extending around each said cam body, each said traction surface comprising a plurality of projections extending transversely to one of said axes of rotation;
   a respective gap in said traction surfaces being positioned between each of said traction surfaces on each said cam body, each said gap being aligned axially with one of said regions of reduced radius.

33. The device according to claim 32, wherein said cam surfaces are positioned between said gear and said traction surfaces on each said cam body.

34. The device according to claim 32, wherein said cam surfaces are positioned proximate to said traction surfaces on each said cam body.

35. The device according to claim 29, wherein each of said cam bodies comprises at most two of said cam surfaces and two of said regions of reduced radius.

36. The device according to claim 32, wherein each of said cam bodies comprises at most two of said cam surfaces, two of said regions of reduced radius, two of said traction surfaces and two of said gaps in said traction surfaces.

* * * * *